United States Patent
Ma et al.

(10) Patent No.: US 9,325,948 B2
(45) Date of Patent: Apr. 26, 2016

(54) REAL-TIME COMPENSATION FOR BLUE SHIFT OF ELECTROMECHANICAL SYSTEMS DISPLAY DEVICES

(71) Applicant: QUALCOMM MEMS Technologies, Inc., San Diego, CA (US)

(72) Inventors: Jian J. Ma, Carlsbad, CA (US); John Hyunchul Hong, San Clemente, CA (US); Chong Uk Lee, San Diego, CA (US); Tallis Young Chang, San Diego, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 531 days.

(21) Appl. No.: 13/675,739

(22) Filed: Nov. 13, 2012

(65) Prior Publication Data

US 2014/0132756 A1 May 15, 2014

(51) Int. Cl.
*H04N 7/18* (2006.01)
*G09G 5/10* (2006.01)
*G09G 3/34* (2006.01)

(52) U.S. Cl.
CPC ............. *H04N 7/18* (2013.01); *G09G 3/3466* (2013.01); *G09G 2320/028* (2013.01); *G09G 2320/0242* (2013.01); *G09G 2320/068* (2013.01); *G09G 2320/0666* (2013.01); *G09G 2360/141* (2013.01); *G09G 2360/144* (2013.01)

(58) Field of Classification Search
USPC .......................................... 345/589; 356/503
See application file for complete search history.

(56) References Cited

U.S. PATENT DOCUMENTS 7,319,560 B2    1/2008   Gunning et al.
7,515,327 B2    4/2009   Cummings
(Continued)

FOREIGN PATENT DOCUMENTS

EP    1640313         2/2011
EP    2413310 A1  *  2/2012
(Continued)

OTHER PUBLICATIONS

Meyer A., et al., "A Single-Camera Remote Eye Tracker", Springer-Verlag Berlin Heidelberg, 2006, pp. 208-211.
(Continued)

*Primary Examiner* — Jason Olson
*Assistant Examiner* — Deeprose Subedi
(74) *Attorney, Agent, or Firm* — Weaver Austin Villeneuve & Sampson, LLP

(57) ABSTRACT

This disclosure provides systems, methods, and apparatus related to electromechanical systems display devices. In one aspect, an apparatus includes a display assembly, a sensor, and a processor. The display assembly may include an array of electromechanical systems display devices. The sensor may be configured to provide a signal indicative of an illumination angle, a viewing angle, or both, with respect to a line perpendicular to the display assembly. The processor may be configured to receive the signal from the sensor, to determine the illumination angle and/or viewing angle, and to process image data to compensate for the determined illumination angle and/or viewing angle. In one implementation, the image data is processed to compensate for a shift in a wavelength of light reflected from at least one of the electromechanical systems display devices that would have occurred as a result of a non-normal illumination and/or viewing angle.

18 Claims, 15 Drawing Sheets

(56) References Cited

U.S. PATENT DOCUMENTS

| | | | |
|---|---|---|---|
| 7,813,026 B2 | 10/2010 | Sampsell | |
| 8,081,373 B2 | 12/2011 | Kothari et al. | |
| 2003/0043157 A1* | 3/2003 | Miles | 345/540 |
| 2004/0174375 A1* | 9/2004 | Credelle et al. | 345/589 |
| 2005/0173647 A1* | 8/2005 | Bakker | G03F 7/70558 250/372 |
| 2006/0066856 A1* | 3/2006 | Cummings | G02B 26/001 356/402 |
| 2006/0077122 A1 | 4/2006 | Gally et al. | |
| 2008/0303806 A1* | 12/2008 | Perrin | 345/207 |
| 2009/0015526 A1* | 1/2009 | Ramanath | G09G 3/3413 345/84 |
| 2009/0102770 A1* | 4/2009 | Iwata et al. | 345/89 |
| 2009/0190045 A1* | 7/2009 | Endo | H04N 9/3123 348/760 |
| 2010/0182336 A1* | 7/2010 | Haga | G09G 3/3607 345/593 |
| 2011/0019380 A1 | 1/2011 | Miles | |
| 2011/0157058 A1* | 6/2011 | Bita | G02B 26/001 345/173 |
| 2011/0248960 A1* | 10/2011 | Gruhlke | G06F 3/0416 345/175 |
| 2012/0172126 A1 | 7/2012 | Padovani et al. | |
| 2013/0286403 A1* | 10/2013 | Matsubara | G01N 21/453 356/457 |
| 2014/0267875 A1* | 9/2014 | Gruhlke | H04N 5/238 348/335 |

FOREIGN PATENT DOCUMENTS

| | | |
|---|---|---|
| TW | 200506793 A | 2/2005 |
| WO | 2007072322 A2 | 6/2007 |
| WO | 2011112962 A1 | 9/2011 |
| WO | WO 2011112962 A9 * | 2/2013 |

OTHER PUBLICATIONS

International Search Report and Written Opinion—PCT/US2013/068271—ISA/EPO—Apr. 11, 2014 (121087WO).

Taiwanese Office Action, dated Aug. 26, 2015, 3 pages.

* cited by examiner

Common Voltages

|  | $VC_{ADD\_H}$ | $VC_{HOLD\_H}$ | $VC_{REL}$ | $VC_{HOLD\_L}$ | $VC_{ADD\_L}$ |
|---|---|---|---|---|---|
| $VS_H$ | Stable | Stable | Relax | Stable | Actuate |
| $VS_L$ | Actuate | Stable | Relax | Stable | Stable |

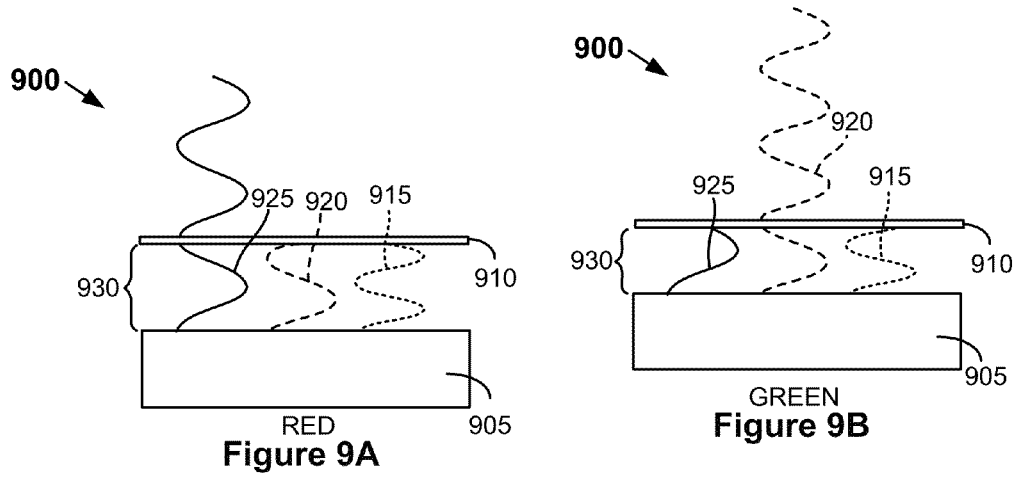
Figure 9A RED
Figure 9B GREEN
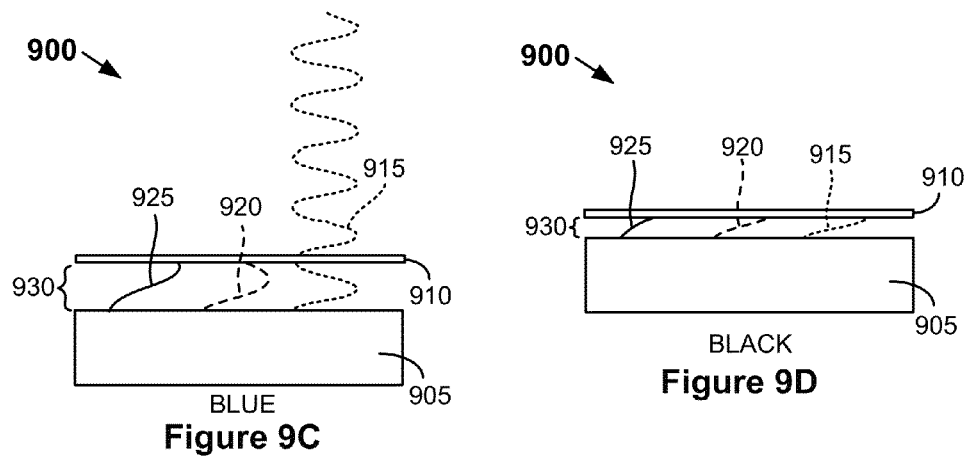
Figure 9C BLUE
Figure 9D BLACK
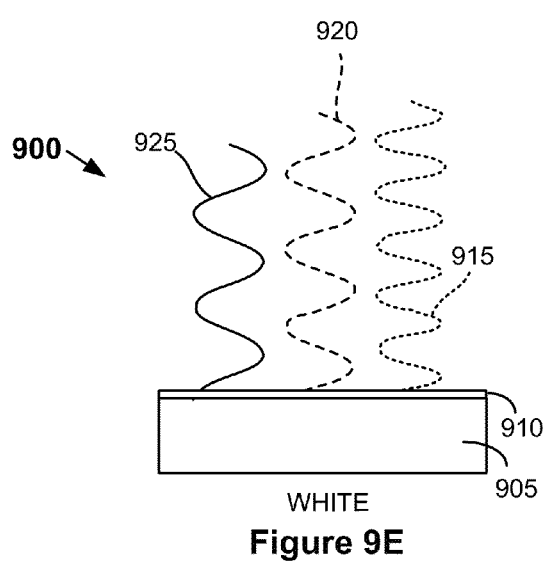
Figure 9E WHITE

REAL-TIME COMPENSATION FOR BLUE SHIFT OF ELECTROMECHANICAL SYSTEMS DISPLAY DEVICES

TECHNICAL FIELD

This disclosure relates generally to electromechanical systems (EMS) display devices, and more particularly to the compensation for blue shift of EMS display devices.

DESCRIPTION OF THE RELATED TECHNOLOGY

Electromechanical systems (EMS) include devices having electrical and mechanical elements, actuators, transducers, sensors, optical components (such as mirrors and optical film layers) and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of electromechanical systems device is called an interferometric modulator (IMOD). As used herein, the term interferometric modulator or interferometric light modulator refers to a device that selectively absorbs and/or reflects light using the principles of optical interference. In some implementations, an interferometric modulator may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a reflective membrane separated from the stationary layer by an air gap. The position of one plate in relation to another can change the optical interference of light incident on the interferometric modulator. Interferometric modulator devices have a wide range of applications, and are anticipated to be used in improving existing products and creating new products, especially those with display capabilities.

Images displayed on various display devices may be sensitive to illumination conditions and viewing conditions. There is a need for display devices capable of displaying colors in image consistently across a multitude of use conditions.

SUMMARY

The systems, methods and devices of the disclosure each have several innovative aspects, no single one of which is solely responsible for the desirable attributes disclosed herein.

One innovative aspect of the subject matter described in this disclosure can be implemented in an apparatus for displaying an image. The apparatus may include a display assembly including an array of electromechanical systems display devices, a sensor and a processor. The sensor may be oriented in a sensor plane having a first angle relative to a plane of the display assembly. The sensor may be configured to provide a first signal. The processor may be configured to communicate with the display assembly and the sensor. The processor may be configured to receive the first signal, determine an illumination angle indicated by the first signal and process image data to compensate the image for the determined illumination angle. The illumination angle may, for example, be determined with respect to the display assembly or to a line perpendicular to the display assembly. The apparatus may include a diffuser configured for producing a haze of about 70% to 90% overlaying the display assembly.

The processor may be further configured to process the image data to compensate the image for a change in a wavelength of light reflected from a first one of the electromechanical systems display devices. The change in wavelength may result from the determined illumination angle.

The sensor may include a plurality of photosensors and a lens. The plurality of photosensors may be arranged as an array of photosensors including a charge-coupled device array and/or a complementary metal-oxide-semiconductor array.

The may include a camera device. The camera device may be oriented in a camera plane having a second angle relative to the plane of the display assembly. The camera device may be configured to provide a second signal. The processor may be configured to receive the second signal, determine a viewing angle with respect to the line perpendicular to the display assembly indicated by the second signal and process the image data to compensate the image for the determined viewing angle. The processor may be further configured to process the image data to compensate the image for a change in a wavelength of light reflected from a first one of the electromechanical systems display devices. The change in wavelength may result from the determined viewing angle.

The apparatus may include a memory device, a driver circuit and a controller. The memory device may be configured to communicate with the processor. The driver circuit may be configured to send at least one second signal to the display assembly. The controller may be configured to send at least a portion of the image data to the driver circuit. The apparatus may include an image source module configured to send the image data to the processor. The image source module may include a receiver, transceiver and/or transmitter. The apparatus also may include an input device configured to receive input data and to communicate the input data to the processor.

Another innovative aspect of the subject matter described in this disclosure can be implemented in an apparatus including a display assembly including an array of electromechanical systems display devices, a sensor system including at least one sensor, a camera device and a processor. The processor may be configured to receive sensor data from the sensor system, to receive image data from the camera and to determine, based on the image data and the sensor data, a viewing angle relative to a plane of the display assembly.

The processor may be configured to control the display assembly to compensate for the viewing angle. The processor may be configured to control the display assembly to compensate for changes in wavelength resulting from the viewing angle.

The sensor may be oriented in a sensor plane having a first angle relative to the plane of the display assembly. The processor may be configured to determine, based at least in part on the sensor data, an illumination angle relative to the display assembly. The processor may be configured to control the display assembly to compensate for the illumination angle.

Another innovative aspect of the subject matter described in this disclosure can be implemented in a method that involves determining an illumination angle and/or a viewing angle. The angle may, for example, be determined with respect to a display assembly or a line perpendicular to the display assembly. The display assembly may include an array of electromechanical systems display devices. If the at least one of the determined illumination angle or viewing angle is non-zero, the method may involve setting an optical gap in at least one of the electromechanical systems display devices of the display assembly, based at least in part on the determined illumination angle and/or viewing angle. The optical gap may be set to compensate for the determined illumination angle and/or viewing angle.

The setting process may involve setting the optical gap to compensate for a change in a wavelength of light reflected from the first electromechanical systems display device. The change may be caused by the illumination angle and/or the viewing angle.

The method may involve filtering a signal indicating the determined illumination angle and/or viewing angle to remove one or more high frequency changes in the illumination angle and/or viewing angle. The illumination angle and/or viewing angle may be determined, at least in part, according to the signal.

The method may involve receiving a signal indicating the illumination angle and/or viewing angle from a camera device and/or a sensor. The camera device and/or the sensor may be oriented in a plane having a second angle relative to a plane of the display assembly. The illumination angle and/or viewing angle may be determined using the signal.

The method may involve determining both an illumination angle and a viewing angle, e.g., with respect to the line perpendicular to the display assembly. The process of setting the optical gap in the first electromechanical systems display device may be based, at least in part, on both the determined illumination angle and the determined viewing angle.

Another innovative aspect of the subject matter described in this disclosure can be implemented in a non-transitory computer machine-readable medium including program instructions for control of an apparatus including a display assembly. The program instructions may include code for operations that include determining an illumination angle and/or a viewing angle. The illumination angle and/or a viewing angle may, for example, be determined with respect to a display assembly or a line perpendicular to the display assembly. The display assembly may include an array of electromechanical systems display devices. If the at least one of the determined illumination angle or viewing angle is non-zero, the operations may involve setting an optical gap in at least one of the electromechanical systems display devices of the display assembly based, at least in part, on the determined illumination angle and/or viewing angle. The optical gap may be set to compensate for the determined illumination angle and/or viewing angle.

The setting process may involve setting the optical gap to compensate for a change in a wavelength of light reflected from the first electromechanical systems display device. The change may be caused by the illumination angle and/or the viewing angle.

Another innovative aspect of the subject matter described in this disclosure can be implemented in a method that involves receiving sensor data from a sensor system, receiving image data from a camera and determining, based at least in part on the image data and/or the sensor data, a viewing angle. The viewing angle may, for example, be determined relative to a plane of a display assembly or relative to a line perpendicular to the display assembly. The method may involve controlling the display assembly to compensate for the viewing angle. The display assembly may include an array of electromechanical systems display devices.

The controlling process may involve controlling the display assembly to compensate for changes in wavelength resulting from the viewing angle. The method may involve determining, based at least in part on the sensor data, an illumination angle relative to the display assembly and controlling the display assembly to compensate for the illumination angle.

Another innovative aspect of the subject matter described in this disclosure can be implemented in a non-transitory medium having program instructions stored thereon. The program instructions may include instructions for operations that include receiving sensor data from a sensor system, receiving image data from a camera and determining, based at least in part on the image data and/or the sensor data, a viewing angle. The viewing angle may, for example, be determined relative to a plane of a display assembly or relative to a line perpendicular to the display assembly. The method may involve controlling the display assembly to compensate for the viewing angle. The display assembly may include an array of electromechanical systems display devices.

The controlling process may involve controlling the display assembly to compensate for changes in wavelength resulting from the viewing angle. The method may involve determining, based at least in part on the sensor data, an illumination angle relative to the display assembly and controlling the display assembly to compensate for the illumination angle.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 9A-9E show examples of how an analog IMOD (AIMOD) may be configured to produce different colors.

Like reference numbers and designations in the various drawings indicate like elements.

DETAILED DESCRIPTION

Figure 1:
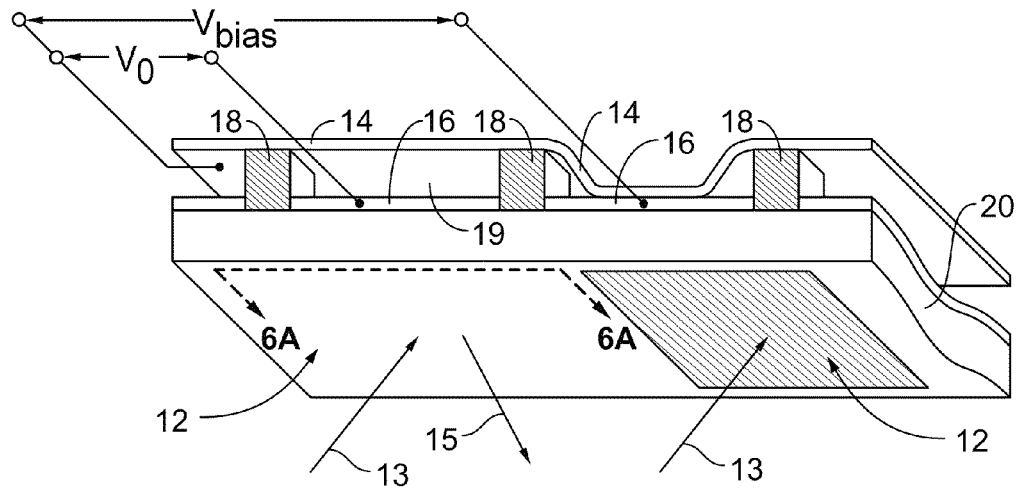
FIG. 1 shows an example of an isometric view depicting two adjacent pixels in a series of pixels of an interferometric modulator (IMOD) display device.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device or system that can be configured to display an image, whether in motion (for example, video) or stationary (for example, still image), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, GPS receivers/navigators, cameras, MP3 players, camcorders, game consoles, wrist watches, clocks, calculators, television monitors, flat panel displays, electronic reading devices (i.e., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS), microelectromechanical systems (MEMS) and non-MEMS applications), aesthetic structures (for example, display of images on a piece of jewelry) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

The optical path of light from a light source to a viewer of an IMOD device or an EMS display device may vary with the illumination angle of the light and the viewing angle of the viewer. In some instances, the variation in the optical path may produce a color shift in the color intended to be reflected from the IMOD device or the EMS display device. For example, the color perceived by a viewer of the IMOD device or the EMS display device may be blue shifted, or be a color having a shorter wavelength from the color intended to be reflected.

Therefore, some implementations described herein relate to the compensation for blue shift of analog EMS display devices, including analog IMOD devices. For example, in some implementations, an apparatus may include a display assembly, a sensor, and a processor. The display assembly may include an array of electromechanical systems display devices. The sensor may be configured to provide a signal and be oriented in a plane substantially parallel to a plane of the display assembly, or in a plane with a known angle to the display device assembly. The processor may be configured to communicate with the display assembly and the sensor. The processor also may be configured to receive the signal from the sensor, to determine an illumination angle with respect to a line perpendicular to the display assembly indicated by the signal, and to process image data to compensate for the determined illumination angle and a resulting change in a wavelength of light reflected from a first one of the electromechanical systems display devices. Such an apparatus may be capable of real-time adjustment of the analog EMS display devices of the display assembly to provide compensation for blue shift.

In some implementations, the apparatus may include a camera device and a sensor system. The processor may be configured to receive sensor data from the sensor system, to receive image data from the camera and to determine, based on the image data and the sensor data, a viewing angle relative to a plane of the display assembly. The processor may be configured to control the display assembly to compensate for the viewing angle. The controlling process may involve setting an optical gap in at least one of the electromechanical systems display devices of the display assembly to compensate for the determined viewing angle. In some implementations, the processor may be configured to control the display assembly to compensate for the viewing angle and for the illumination angle.

Particular implementations of the subject matter described in this disclosure can be implemented to realize one or more of the following potential advantages. The apparatus and methods disclosed herein may be used for real-time adjustments of analog EMS display devices to compensate for blue shift. In some implementations, the apparatus and methods may be used with a low-haze diffuser (for example, a diffuser that scatters about 50% to 70% of incident light) positioned proximate the EMS display devices to reduce the blue shift of the EMS display devices. A diffuser is a film or a device that is configured to diffuse or spread out incident light into a broad angular distribution. The haze of a diffuser, as used herein, is defined as the percentage of light transmitted by the diffuser that is scattered more than about ±2.5 degrees from the direction of the incident light. A high-haze diffuser (for example, greater than about 90%) may be used with an EMS display device to reduce the blue shift, but high-haze diffusers may reduce the color gamut and the color saturation of the EMS display device. Further, a high-haze diffuser also may cause cross-talk between individual EMS display devices (e.g., pixels) of a display assembly when the diffuser is located a distance away from the display assembly, thereby degrading the optical quality of a display device comprised of an array of the EMS display devices. Use of the apparatus and methods disclosed herein may allow for the use of low-haze diffusers.

An example of a suitable EMS or MEMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the interferometric modulator. The reflectance spectrums of IMODs can create fairly broad spectral bands which can be shifted across the visible wavelengths to generate different colors. The position of the spectral band can be adjusted by changing the thickness of the optical resonant cavity. One way of changing the optical resonant cavity is by changing the position of the reflector.

FIG. 1 shows an example of an isometric view depicting two adjacent pixels in a series of pixels of a bi-stable interferometric modulator (IMOD) display device. Details of a bi-stable IMOD device will be described in further detail in FIGS. 1-8E to provide general background, however, it is understood that some IMOD devices can be in a multitude of states, such as 8 or 16 (corresponding to white, black, and 6 or 14 other colors), or more. Such an IMOD may often be referred to as an "analog" IMOD, even if the IMOD has a non-infinite number of controllable states. Some discussion of such an implementation of an IMOD will be provided in FIG. 9A-9E. Returning to FIG. 1, the IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, for example, to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when unactuated, absorbing and/or destructively interfering light within the visible range. In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent interferometric modulators 12. In the IMOD 12 on the left (as illustrated), a movable reflective layer 14 is illustrated in a relaxed position at a predetermined distance from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near or adjacent the optical stack 16. The voltage $V_{bias}$ applied across the IMOD 12 on the right is sufficient to maintain the movable reflective layer 14 in the actuated position.

In FIG. 1, the reflective properties of pixels 12 are generally illustrated with arrows 13 indicating light incident upon the pixels 12, and light 15 reflecting from the pixel 12 on the left. Although not illustrated in detail, it will be understood by a person having ordinary skill in the art that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixel 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, such as chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and electrical conductor, while different, electrically more conductive layers or portions (for example, of the optical stack 16 or of other structures of the IMOD) can serve to bus signals between IMOD pixels. The optical stack 16 also can include one or more insulating or dielectric layers covering one or more conductive layers or an electrically conductive/optically absorptive layer.

In some implementations, the layer(s) of the optical stack 16 can be patterned into parallel strips, and may form row electrodes in a display device as described further below. As will be understood by one having ordinary skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be approximately 1-1000 um, while the gap 19 may be less than <10,000 Angstroms (Å).

In some implementations, each pixel of the IMOD, whether in the actuated or relaxed state, is essentially a capacitor formed by the fixed and moving reflective layers. When no voltage is applied, the movable reflective layer 14 remains in a mechanically relaxed state, as illustrated by the pixel 12 on the left in FIG. 1, with the gap 19 between the movable reflective layer 14 and optical stack 16. However, when a potential difference, a voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 on the right in FIG. 1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
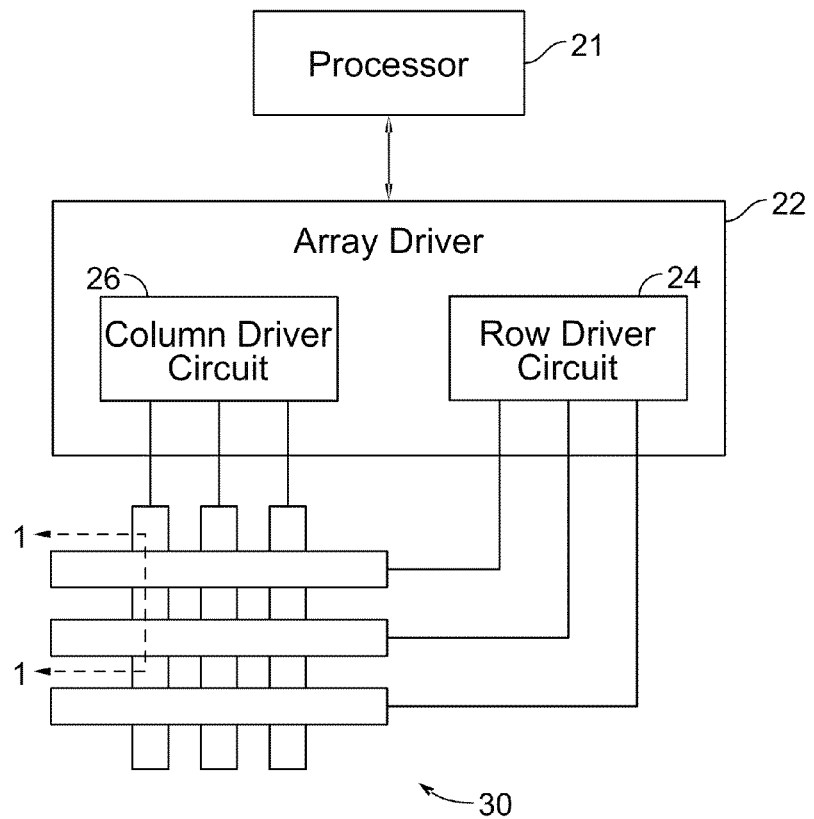
FIG. 2 shows an example of a system block diagram illustrating an electronic device incorporating a 3×3 interferometric modulator display.

FIG. 2 shows an example of a system block diagram illustrating an electronic device incorporating a 3×3 interferometric modulator display. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, for example, a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3, 4:
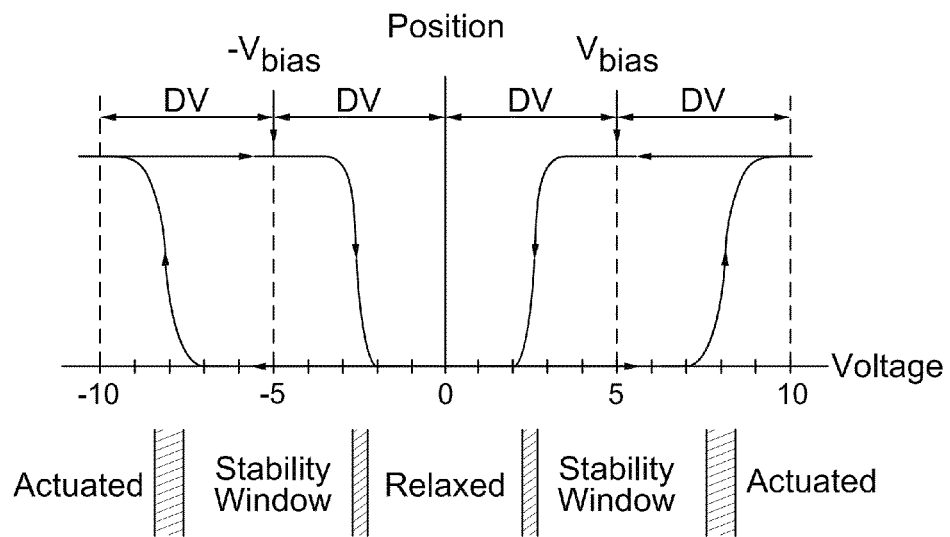
FIG. 3 shows an example of a diagram illustrating movable reflective layer position versus applied voltage for the interferometric modulator of FIG. 1.
FIG. 4 shows an example of a table illustrating various states of an interferometric modulator when various common and segment voltages are applied.

FIG. 3 shows an example of a diagram illustrating movable reflective layer position versus applied voltage for the interferometric modulator of FIG. 1. For MEMS interferometric modulators, the row/column (i.e., common/segment) write procedure may take advantage of a hysteresis property of these devices as illustrated in FIG. 3. An interferometric modulator may use, in one example implementation, about a 10-volt potential difference to cause the movable reflective layer, or mirror, to change from the relaxed state to the actuated state. When the voltage is reduced from that value, the movable reflective layer maintains its state as the voltage drops back below, in this example, 10 volts, however, the movable reflective layer does not relax completely until the voltage drops below 2 volts. Thus, a range of voltage, approximately 3 to 7 volts, in this example, as shown in FIG. 3, exists where there is a window of applied voltage within which the device is stable in either the relaxed or actuated state. This is referred to herein as the "hysteresis window" or "stability window." For a display array 30 having the hysteresis characteristics of FIG. 3, the row/column write procedure can be designed to address one or more rows at a time, such that during the addressing of a given row, pixels in the addressed row that are to be actuated are exposed to a voltage difference of about, in this example, 10 volts, and pixels that are to be relaxed are exposed to a voltage difference of near zero volts. After addressing, the pixels can be exposed to a steady state or bias voltage difference of approximately 5 volts in this example, such that they remain in the previous strobing state. In this example, after being addressed, each pixel sees a potential difference within the "stability window" of about 3-7 volts. This hysteresis property feature enables the pixel design, such as that illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each pixel (that is, the potential difference across each pixel) determines the resulting state of each pixel. FIG. 4 shows an example of a table illustrating various states of an interferometric modulator when various common and segment voltages are applied. As will be understood by one having ordinary skill in the art, the "segment" voltages can be applied to either the column electrodes or the row electrodes, and the "common" voltages can be applied to the other of the column electrodes or the row electrodes.

As illustrated in FIG. 4 (as well as in the timing diagram shown in FIG. 5B), when a release voltage $VC_{REL}$ is applied along a common line, all interferometric modulator elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator pixels (alternatively referred to as a pixel voltage) is within the relaxation window (see FIG. 3, also referred to as a release window) both when the high segment voltage $VS_H$ and the low segment voltage $VS_L$ are applied along the corresponding segment line for that pixel.

When a hold voltage is applied on a common line, such as a high hold voltage $VC_{HOLD\_H}$ or a low hold voltage $VC_{HOLD\_L}$, the state of the interferometric modulator will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, such as a high addressing voltage $VC_{ADD\_H}$ or a low addressing voltage $VC_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which produce the same polarity potential difference across the modulators. In some other implementations, signals can be used which alternate the polarity of the potential difference of the modulators from time to time. Alternation of the polarity across the modulators (that is, alternation of the polarity of write procedures) may reduce or inhibit charge accumulation which could occur after repeated write operations of a single polarity.

Figure 5A:
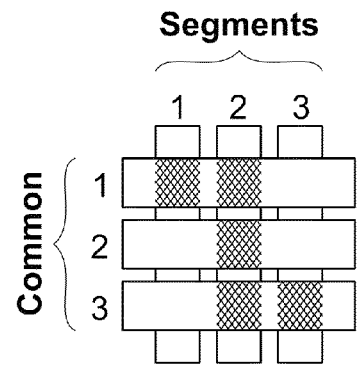
FIG. 5A shows an example of a diagram illustrating a frame of display data in the 3×3 interferometric modulator display of FIG. 2.
Figure 5B:
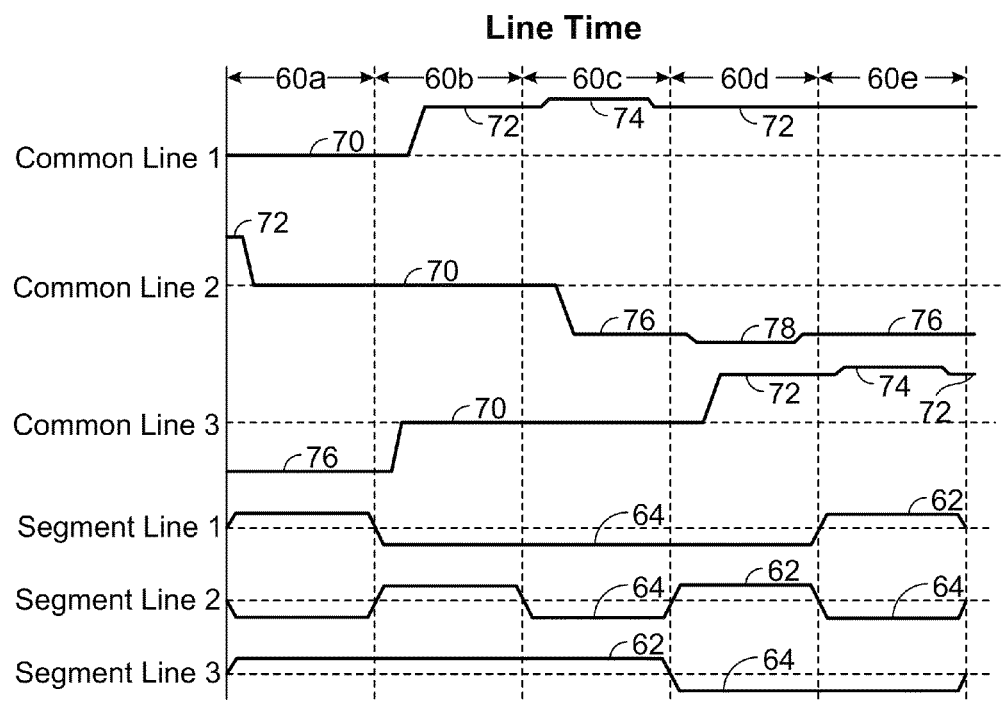
FIG. 5B shows an example of a timing diagram for common and segment signals that may be used to write the frame of display data illustrated in FIG. 5A.

FIG. 5A shows an example of a diagram illustrating a frame of display data in the 3×3 interferometric modulator display of FIG. 2. FIG. 5B shows an example of a timing diagram for common and segment signals that may be used to write the frame of display data illustrated in FIG. 5A. The signals can be applied to a 3×3 array, similar to the array of FIG. 2, which will ultimately result in the line time 60e display arrangement illustrated in FIG. 5A. The actuated modulators in FIG. 5A are in a dark-state, i.e., where a substantial portion of the reflected light is outside of the visible spectrum so as to result in a dark appearance to, for example, a viewer. Prior to writing the frame illustrated in FIG. 5A, the pixels can be in any state, but the write procedure illustrated in the timing diagram of FIG. 5B presumes that each modulator has been released and resides in an unactuated state before the first line time 60a.

During the first line time 60a: a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, or unactuated, state for the duration of the first line time 60a, the modulators (2,1), (2,2) and (2,3) along common line 2 will move to a relaxed state, and the modulators (3,1), (3,2) and (3,3) along common line 3 will remain in their previous state. With reference to FIG. 4, the segment voltages applied along segment lines 1, 2 and 3 will have no effect on the state of the interferometric modulators, as none of common lines 1, 2 or 3 are being exposed to voltage levels causing actuation during line time 60a (i.e., $VC_{REL}$—relax and $VC_{HOLD\_L}$—stable).

During the second line time 60b, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3,1), (3,2) and (3,3) along common line 3 will relax when the voltage along common line 3 moves to a release voltage 70.

During the third line time 60c, common line 1 is addressed by applying a high address voltage 74 on common line 1. Because a low segment voltage 64 is applied along segment lines 1 and 2 during the application of this address voltage, the pixel voltage across modulators (1,1) and (1,2) is greater than the high end of the positive stability window (i.e., the voltage differential exceeded a predefined threshold) of the modulators, and the modulators (1,1) and (1,2) are actuated. Conversely, because a high segment voltage 62 is applied along segment line 3, the pixel voltage across modulator (1,3) is less than that of modulators (1,1) and (1,2), and remains within the positive stability window of the modulator; modulator (1,3) thus remains relaxed. Also during line time 60c, the voltage along common line 2 decreases to a low hold voltage 76, and the voltage along common line 3 remains at a release voltage 70, leaving the modulators along common lines 2 and 3 in a relaxed position.

During the fourth line time 60d, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2,2) is below the lower end of the negative stability window of the modulator, causing the modulator (2,2) to actuate. Conversely, because a low segment voltage 64 is applied along segment lines 1 and 3, the modulators (2,1) and (2,3) remain in a relaxed position. The voltage on common line 3 increases to a high hold voltage 72, leaving the modulators along common line 3 in a relaxed state.

Finally, during the fifth line time 60e, the voltage on common line 1 remains at high hold voltage 72, and the voltage on common line 2 remains at a low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3,2) and (3,3) actuate, while the high segment voltage 62 applied along segment line 1 causes modulator (3,1) to remain in a relaxed position. Thus, at the end of the fifth line time 60e, the 3×3 pixel array is in the state shown in FIG. 5A, and will remain in that state as long as the hold voltages are applied along the common lines, regardless of variations in the segment voltage which may occur when modulators along other common lines (not shown) are being addressed.

In the timing diagram of FIG. 5B, a given write procedure (i.e., line times 60a-60e) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the line time. Specifically, in implementations in which the release time of a modulator is greater than the actuation time, the release voltage may be applied for longer than a single line time, as depicted in FIG. 5B. In some other implementations, voltages applied along common lines or segment lines may vary to account for variations in the actuation and release voltages of different modulators, such as modulators of different colors.

Figure 6A:
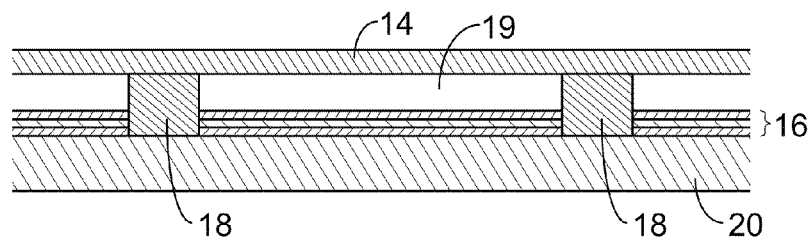
FIG. 6A shows an example of a partial cross-section of the interferometric modulator display of FIG. 1.
Figure 6B:
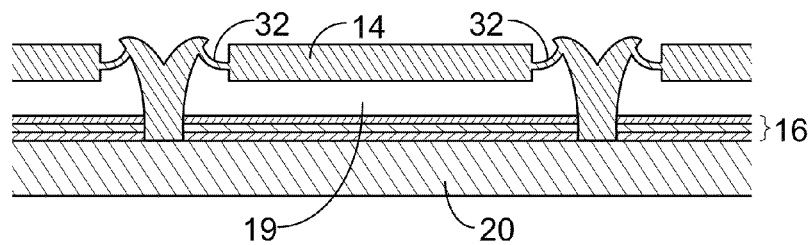
FIGS. 6B-6E show examples of cross-sections of varying implementations of interferometric modulators.
Figure 6C:
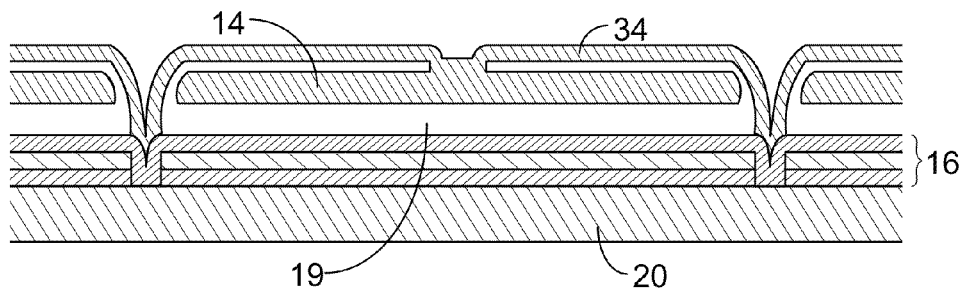

The details of the structure of interferometric modulators that operate in accordance with the principles set forth above may vary widely. For example, FIGS. 6A-6E show examples of cross-sections of varying implementations of interferometric modulators, including the movable reflective layer 14 and its supporting structures. FIG. 6A shows an example of a partial cross-section of the interferometric modulator display of FIG. 1, where a strip of metal material, i.e., the movable reflective layer 14 is deposited on supports 18 extending orthogonally from the substrate 20. In FIG. 6B, the movable reflective layer 14 of each IMOD is generally square or rectangular in shape and attached to supports at or near the corners, on tethers 32. In FIG. 6C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 6C has additional benefits deriving from the decoupling of the optical functions of the movable reflective layer 14 from its mechanical functions, which are carried out by the deformable layer 34. This decoupling allows the structural design and materials used for the reflective layer 14 and those used for the deformable layer 34 to be optimized independently of one another.

Figure 6D:
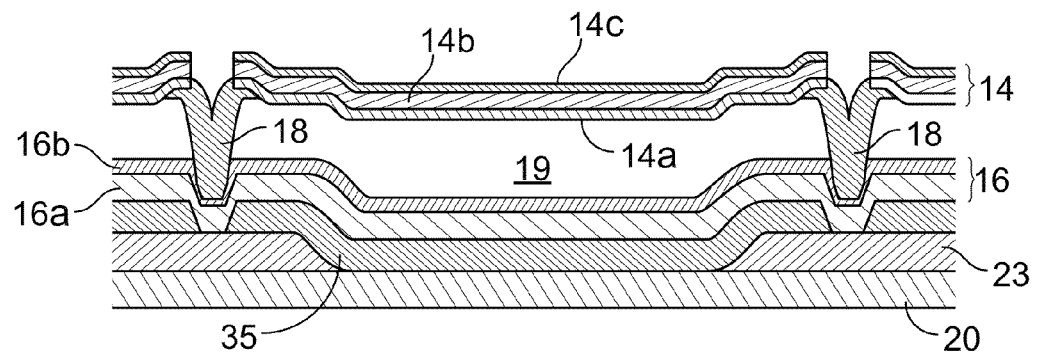

FIG. 6D shows another example of an IMOD, where the movable reflective layer 14 includes a reflective sub-layer 14a. The movable reflective layer 14 rests on a support structure, such as support posts 18. The support posts 18 provide separation of the movable reflective layer 14 from the lower stationary electrode (i.e., part of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide ($SiO_2$). In some implementations, the support layer 14b can be a stack of layers, such as, for example, a $SiO_2$/SiON/$SiO_2$ tri-layer stack. Either or both of the reflective sub-layer 14a and the conductive layer 14c can include, for example, an aluminum (Al) alloy with about 0.5% copper (Cu), or another reflective metallic material. Employing conductive layers 14a, 14c above and below the dielectric support layer 14b can balance stresses and provide enhanced conduction. In some implementations, the reflective sub-layer 14a and the conductive layer 14c can be formed of different materials for a variety of design purposes, such as achieving specific stress profiles within the movable reflective layer 14.

As illustrated in FIG. 6D, some implementations also can include a black mask structure 23. The black mask structure 23 can be formed in optically inactive regions (such as between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, a layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, carbon tetrafluoromethane ($CF_4$) and/or oxygen ($O_2$) for the MoCr and $SiO_2$ layers and chlorine ($Cl_2$) and/or boron trichloride ($BCl_3$) for the aluminum alloy layer. In some implementations, the black mask 23 can be an etalon or interferometric stack structure. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate the absorber layer 16a from the conductive layers in the black mask 23.

Figure 6E:
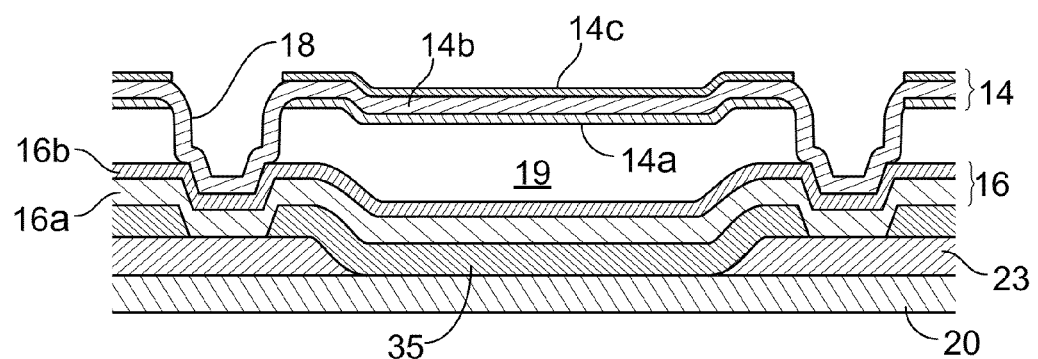

FIG. 6E shows another example of an IMOD, where the movable reflective layer 14 is self-supporting. In contrast with FIG. 6D, the implementation of FIG. 6E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 6E when the voltage across the interferometric modulator is insufficient to cause actuation. The optical stack 16, which may contain a plurality of several different layers, is shown here for clarity including an optical absorber 16a, and a dielectric 16b. In some implementations, the optical absorber 16a may serve both as a fixed electrode and as a partially reflective layer. In some implementations, the optical absorber 16a is an order of magnitude (ten times or more) thinner than the movable reflective layer 14. In some implementations, optical absorber 16a is thinner than reflective sub-layer 14a.

In implementations such as those shown in FIGS. 6A-6E, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 6C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing. Additionally, the implementations of FIGS. 6A-6E can simplify processing, such as, for example, patterning.

Figure 7:
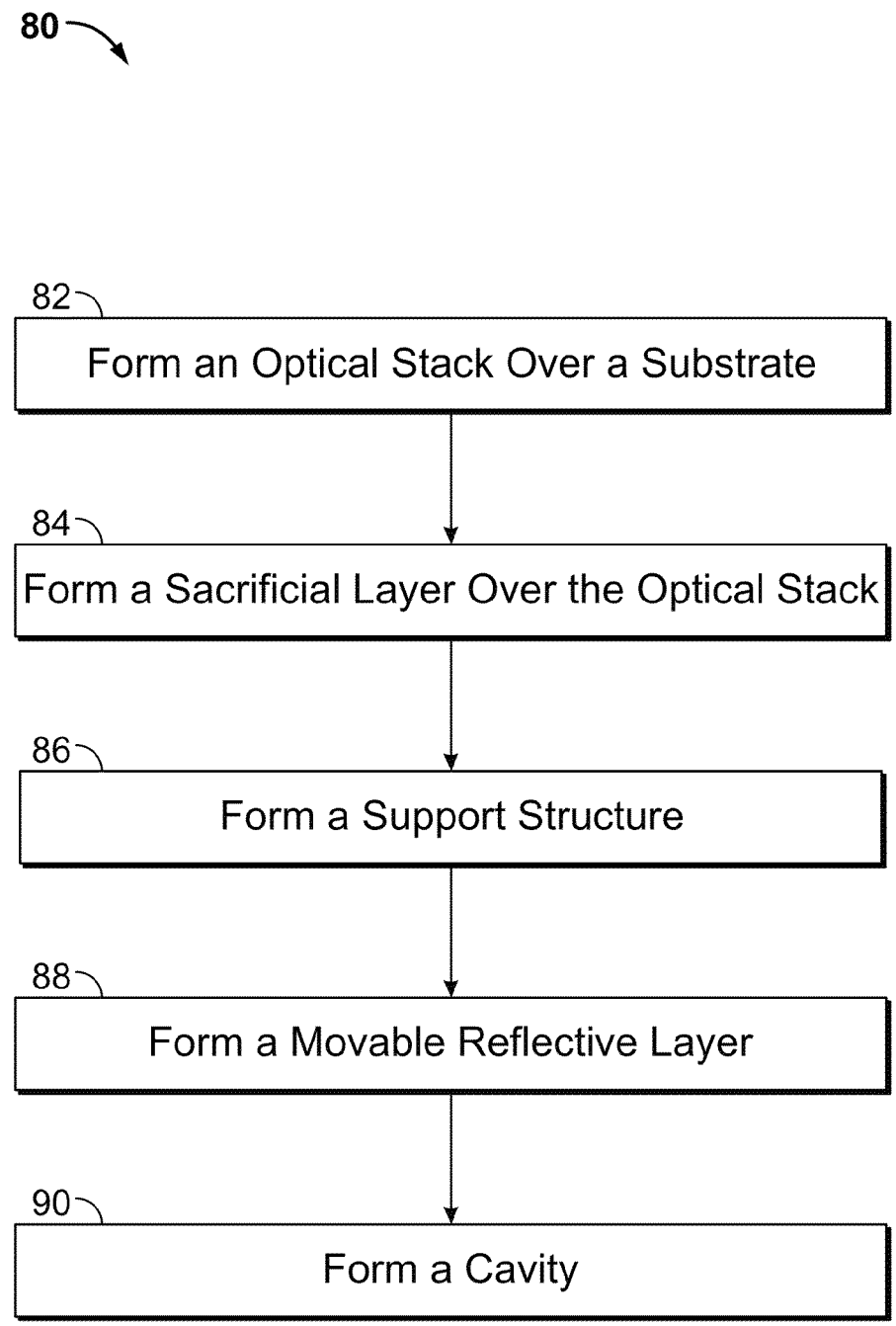
FIG. 7 shows an example of a flow diagram illustrating a manufacturing process for an interferometric modulator.
Figure 8A:
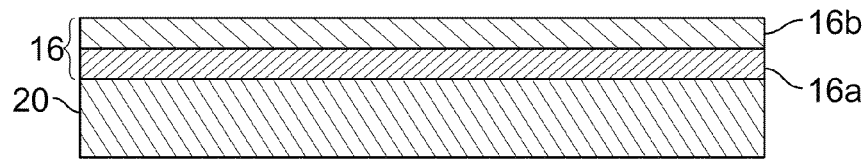
FIGS. 8A-8E show examples of cross-sectional schematic illustrations of various stages in a method of making an interferometric modulator.

FIG. 7 shows an example of a flow diagram illustrating a manufacturing process 80 for an interferometric modulator, and FIGS. 8A-8E show examples of cross-sectional schematic illustrations of corresponding stages of such a manufacturing process 80. In some implementations, the manufacturing process 80 can be implemented to manufacture an electromechanical systems device such as interferometric modulators of the general type illustrated in FIGS. 1 and 6. The manufacture of an electromechanical systems device can also include other blocks not shown in FIG. 7. With reference to FIGS. 1, 6 and 7, the process 80 begins at block 82 with the formation of the optical stack 16 over the substrate 20. FIG. 8A illustrates such an optical stack 16 formed over the substrate 20. The substrate 20 may be a transparent substrate such as glass or plastic, it may be flexible or relatively stiff and unbending, and may have been subjected to prior preparation processes, such as cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In FIG. 8A, the optical stack 16 includes a multilayer structure having sub-layers 16a and 16b, although more or fewer sub-layers may be included in some other implementations. In some implementations, one of the sub-layers 16a, 16b can be configured with both optically absorptive and electrically conductive properties, such as the combined conductor/absorber sub-layer 16a. Additionally, one or more of the sub-layers 16a, 16b can be patterned into parallel strips, and may form row electrodes in a display device. Such patterning can be performed by a masking and etching process or another suitable process known in the art. In some implementations, one of the sub-layers 16a, 16b can be an insulating or dielectric layer, such as sub-layer 16b that is deposited over one or more metal layers (for example, one or more reflective and/or conductive layers). In addition, the optical stack 16 can be patterned into individual and parallel strips that form the rows of the display. It is noted that FIGS. 8A-8E may not be drawn to scale. For example, in some implementations, one of the sub-layers of the optical stack, the optically absorptive layer, may be very thin, although sub-layers 16a, 16b are shown somewhat thick in FIGS. 8A-8E.

Figure 8B:
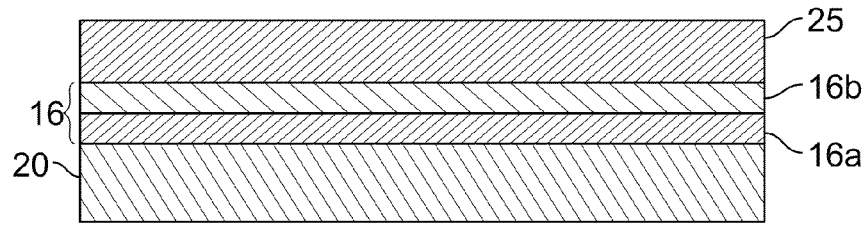

The process 80 continues at block 84 with the formation of a sacrificial layer 25 over the optical stack 16. The sacrificial layer 25 is later removed (see block 90) to form the cavity 19 and thus the sacrificial layer 25 is not shown in the resulting interferometric modulators 12 illustrated in FIG. 1. FIG. 8B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (a-Si), in a thickness selected to provide, after subsequent removal, a gap or cavity 19 (see also FIGS. 1 and 8E) having a desired design size. Deposition of the sacrificial material may be carried out using deposition techniques such as physical vapor deposition (PVD, which includes many different techniques, such as sputtering), plasma-enhanced chemical vapor deposition (PECVD), thermal chemical vapor deposition (thermal CVD), or spin-coating.

Figure 8C:
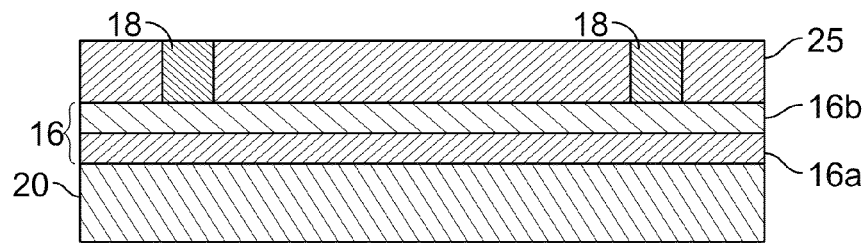

The process 80 continues at block 86 with the formation of a support structure such as post 18, illustrated in FIGS. 1, 6 and 8C. The formation of the post 18 may include patterning the sacrificial layer 25 to form a support structure aperture, then depositing a material (such as a polymer or an inorganic material such as silicon oxide) into the aperture to form the post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 6A. Alternatively, as depicted in FIG. 8C, the aperture formed in the sacrificial layer 25 can extend through the sacrificial layer 25, but not through the optical stack 16. For example, FIG. 8E illustrates the lower ends of the support posts 18 in contact with an upper surface of the optical stack 16. The post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 8C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

Figure 8D:
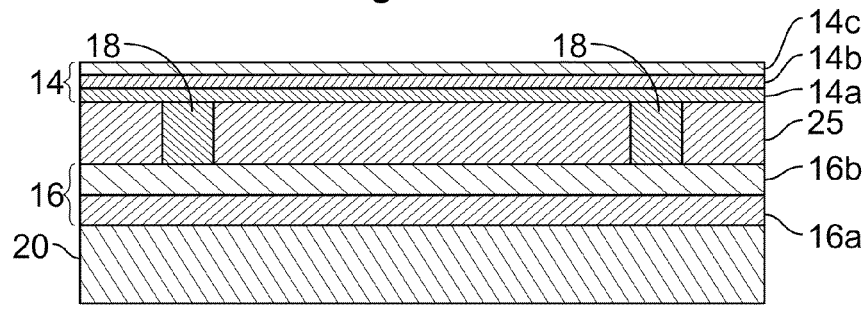
Figure 8E:
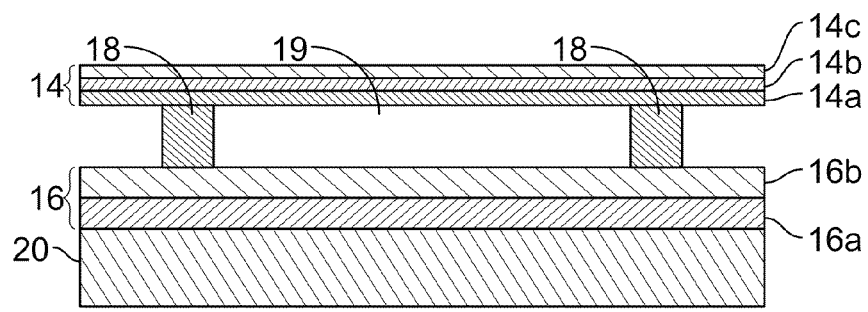

The process 80 continues at block 88 with the formation of a movable reflective layer or membrane such as the movable reflective layer 14 illustrated in FIGS. 1, 6 and 8D. The movable reflective layer 14 may be formed by employing one or more deposition steps including, for example, reflective layer (such as aluminum, aluminum alloy, or other reflective layer) deposition, along with one or more patterning, masking, and/or etching steps. The movable reflective layer 14 can be electrically conductive, and referred to as an electrically conductive layer. In some implementations, the movable reflective layer 14 may include a plurality of sub-layers 14a, 14b, 14c as shown in FIG. 8D. In some implementations, one or more of the sub-layers, such as sub-layers 14a, 14c, may include highly reflective sub-layers selected for their optical properties, and another sub-layer 14b may include a mechanical sub-layer selected for its mechanical properties. Since the sacrificial layer 25 is still present in the partially fabricated interferometric modulator formed at block 88, the movable reflective layer 14 is typically not movable at this stage. A partially fabricated IMOD that contains a sacrificial layer 25 also may be referred to herein as an "unreleased" IMOD. As described above in connection with FIG. 1, the movable reflective layer 14 can be patterned into individual and parallel strips that form the columns of the display.

The process 80 continues at block 90 with the formation of a cavity, such as cavity 19 illustrated in FIGS. 1, 6 and 8E. The cavity 19 may be formed by exposing the sacrificial material 25 (deposited at block 84) to an etchant. For example, an etchable sacrificial material such as Mo or a-Si may be removed by dry chemical etching, by exposing the sacrificial layer 25 to a gaseous or vaporous etchant, such as vapors derived from solid $XeF_2$, for a period of time that is effective to remove the desired amount of material. The sacrificial material is typically selectively removed relative to the structures surrounding the cavity 19. Other etching methods, such as wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

FIGS. 9A-9E show examples of how an analog IMOD (AIMOD) may be configured to produce different colors. As in a bi-stable IMOD device, in an AIMOD, a pixel's reflective color may be varied by changing the gap spacing between an absorber stack and a mirror stack. However, unlike a bi-stable IMOD device, an AIMOD can have more than just two states, a relaxed and actuated state. Rather, an AIMOD can have a multitude of states, such as three (3) or more, five (5) or more states, eight (8) or more or sixteen (16) or more states. For example, an AIMOD can have eight (8) states, white, black, and six (6) other colors. To control the AIMOD at so many states, a control circuit including one or more switches (such as thin film transistors) can be provided to address each AIMOD individually and provide an appropriate voltage difference between a movable and stationary electrode of the AIMOD for the absorber stack and the mirror stack to be displaced a particular distance. In FIGS. 9A-9E, the AIMOD 900 includes the mirror stack 905 and the absorber stack 910. In this implementation, the mirror stack 905 includes at least one reflective layer and is shown at five positions relative to the absorber stack 910. However, in various implementations, an AIMOD 900 may be movable between substantially more than 5 positions relative to the mirror stack 905. In some such implementations, the size of the gap 930 between the mirror stack 905 and the absorber stack 910 may be varied in a substantially continuous manner. In some such AIMODs 900, the size of the gap 930 may be controlled with a high level of precision, e.g., with an error of 10 nm or less. Although the absorber stack 910 includes a single absorber layer in this example, alternative implementations of the absorber stack 910 may include multiple absorber layers.

An incident wave having a wavelength λ will interfere with its own reflection from the mirror stack 905 to create a standing wave with local peaks and nulls. The first null is λ/2 from the mirror and subsequent nulls are located at λ/2 intervals. For that wavelength, a thin absorber layer placed at one of the null positions will absorb very little energy. Hence colors corresponding to that wavelength will be transmitted, while colors corresponding to wavelengths having greater energy will be partially or largely absorbed.

Referring first to FIG. 9A, when the gap 930 is substantially equal to the half wavelength of a red color 925, the absorber stack 910 is positioned at the null of the red interference pattern. Light is partially reflected and partially transmitted by the absorber stack 910. An optical cavity having a depth equal to the size of the gap 930 is formed between the absorber stack 910 and the mirror stack 905. Therefore, light having a wavelength substantially corresponding to the red color 925 is reflected (not absorbed) efficiently due to constructive interference between red light reflected from the absorber stack 910 and red light reflected from the mirror stack 905. Light of other colors, including the blue color 915 and the green color 920, is not reinforced by constructive interference. Instead, such light is substantially absorbed by the absorber stack 910.

FIG. 9B depicts the AIMOD 900 in a configuration wherein the mirror stack 905 is moved closer to the absorber stack 910 (or vice versa). In this example, the gap 930 is substantially equal to the half wavelength of the green color 920. Light having a wavelength substantially corresponding to the green color 920 is reflected efficiently (not absorbed) due to constructive interference between green light reflected from the absorber stack 910 and green light reflected from the mirror stack 905. Light of other colors, including the red color 925 and the blue color 915, is substantially absorbed by the absorber stack 910.

In FIG. 9C, the mirror stack 905 is moved closer to the absorber stack 910 (or vice versa), so that the gap 930 is substantially equal to the half wavelength of the blue color 915. Light having a wavelength substantially corresponding to the blue color 915 is reflected (not absorbed) efficiently due to constructive interference. Light of other colors, including the red color 925 and the green color 920, is substantially absorbed by the absorber stack 910.

In FIG. 9D, however, the AIMOD 900 is in a configuration wherein the gap 930 is substantially equal to ¼ of the wavelength of the average color in the visible range. In such arrangement, the absorber is located near the intensity peak (or at a location where there is significant optical power) of the interference standing wave for a range of wavelengths; the strong absorption due to high field intensity causes relatively little visible light to be reflected from the AIMOD 900. This configuration may be referred to herein as a "black state." In some such implementations, the gap 930 may be made larger or smaller than shown in FIG. 9D, in order to reinforce other wavelengths that are outside the visible range. Accordingly, the configuration of the AIMOD 900 shown in FIG. 9D provides merely one example of a black state configuration of the AIMOD 900.

FIG. 9E depicts the AIMOD 900 in a configuration wherein the absorber stack 910 is substantially adjacent to the mirror stack 905. In this example, the gap 930 is negligible. Light having a broad range of wavelengths is reflected efficiently from the mirror stack 905 without being absorbed to a significant degree by the absorber stack 910. This configuration may be referred to herein as a "white state."

As described above, analog EMS display devices, including analog IMOD devices, the optical gap can be continuously adjustable to reflect light at a desired color. For example, the thickness or height of an optical gap, air gap, or cavity formed by a movable reflective layer and a fixed partially reflective and partially absorptive layer of an analog EMS display device may be varied to change the wavelength, and the color, of the light reflected by the device.

The color of light that some EMS display devices reflect also may depend on the illumination angle of the EMS display devices. For example, EMS display devices may be illuminated by direct illumination. Direct illumination is light from a source which is incident upon an EMS display device, without the light reflecting off of any surfaces in between the source and the EMS display device.

EMS display devices may be included in a display assembly, with absorptive and reflective layers of the EMS display devices being positioned in planes that are substantially parallel to a surface of the display assembly. The illumination angle for an EMS display device included in a display assembly is the angle of the incident light with respect to a line perpendicular or normal to a surface of the EMS display device and to a surface of the display assembly. When the illumination angle increases, the light reflected by the EMS display device may be shifted to a shorter wavelength. This is known as blue shift, and the reflected light may not be perceived by the user as the desired color that was intended to be generated or displayed.

It may be difficult to compensate for such a blue shift in displays that include digital IMODs that cannot change the reflected color continuously by adjusting the optical gap. However, for analog EMD displays that include analog IMODs, the optical gap can be adjusted. Therefore, the blue shift can be compensated if the amount of the adjustment is known. In the following discussion, the display device or display assembly referred to is an analog IMOD display device or assembly.

Figure 10A:
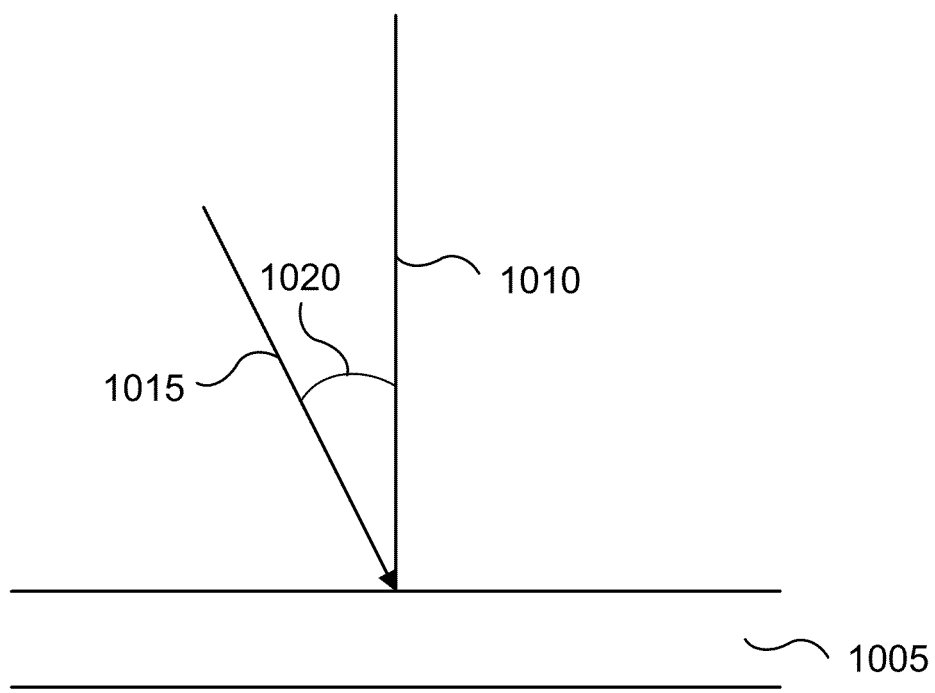
FIG. 10A shows an example of a diagram illustrating the illumination angle of a display assembly.

FIG. 10A shows an example of a diagram illustrating the illumination angle of a display assembly. As shown in FIG. 10A, a surface of a display assembly 1005 has a line 1010 perpendicular to it. When a direct illumination source is shining light 1015 that is incident upon the surface of the display assembly 1005, the illumination angle is an angle 1020. That is, for the display assembly 1005, the illumination angle may be taken as the angle 1020 at which light 1015 is incident upon the display assembly 1005 with respect to the line 1010 perpendicular to the display assembly 1005.

In some implementations, a direct illumination source may be taken to be an illumination source that is located at an infinite distance from the display assembly 1005. For example, the sun on a clear, cloudless day may be taken as a direct illumination source. For illumination angles, when the sun is directly overhead at a point on the earth's surface, the illumination angle is zero, for example. At sunrise and sunset, the illumination angle at a point on the earth's surface is 90 degrees, for example.

The blue shift of an EMS display device due to the illumination angle can be expressed as:

$$\lambda'(\theta) = \lambda \cos \theta$$

where $\lambda$ is the wavelength reflected by an EMS display device at normal illumination (i.e., the illumination being normal to the EMS display device, and the illumination angle being 0), $\theta$ is the illumination angle, and $\lambda'(\theta)$ is the blue shifted reflected wavelength observed by a user. When the illumination angle $\theta$ is 0, $\cos \theta = 1$; i.e., there is no blue shift when the illumination angle $\theta$ is 0.

The reflection spectrum (power versus wavelength) of an EMS display device can be characterized by its peak wavelength, $\lambda_{peak}$; i.e., $\lambda_{peak}$ is the wavelength of reflected light that a user would observe with an illumination angle $\theta$ of 0. The blue shift in $\lambda_{peak}$ that may occur with changes in the illumination angle $\theta$ can be calculated with the same equation described above. Further, $\lambda_{peak}$ for normal illumination on an EMS display device can be determined by:

$$\lambda_{peak} = md = m(d_{die} + d_{air})$$

where m is an integer and d is the optical distance between the movable reflective layer and the fixed partially reflective partially absorptive layer, for example, of the EMS display device. In some cases, d can be decomposed into two parts, $d_{die}$ and $d_{air}$. $d_{die}$ accounts for the thicknesses of dielectric layers that may be disposed on the movable reflective layer and the fixed partially reflective partially absorptive layer, for example. $d_{air}$ is the thickness of the optical gap or air gap formed by the movable reflective layer and the fixed partially reflective partially absorptive layer. The optical gap or air gap that compensates for the blue shift of the EMS display device can be calculated through the measurement of illumination angle $\theta$ as:

$$d_{air} = \frac{\lambda_{peak}}{m \cos \theta} - d_{die}$$

Figure 10B:
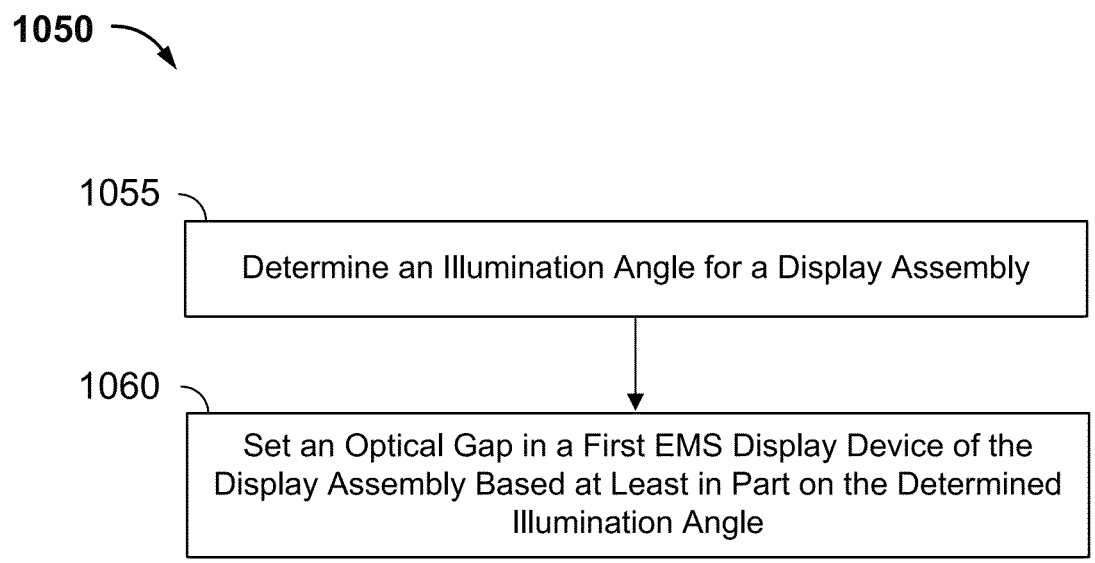
FIG. 10B shows an example of a flow diagram illustrating a process for compensating for the blue shift of an EMS display device under direct illumination.

FIG. 10B shows an example of a flow diagram illustrating a process for compensating for the blue shift of an EMS display device under direct illumination. At block 1055 of the process 1050, an illumination angle for a display assembly is determined. As explained above with respect to FIG. 10A, the illumination angle is the angle of the incident light with respect to a line perpendicular or normal to a surface of the display assembly. In some implementations, the illumination angle for the display assembly is determined in real-time. The term "real-time" may denote or relate to a process or a system, such as an electronic circuit of a computing device, in which the process is performed or the system performs an event or function substantially instantaneously. For example, when using a real-time system, a user may experience no noticeable or perceptible delay in the performance of the system.

In some implementations, the display assembly may include an array of EMS display devices, such as a row/column array of a plurality of EMS display devices. In some implementations, the display assembly may be part of a device, and a camera device that is also part of the device may provide a signal that may be used to determine the illumination angle. For example, the camera device may be the front-facing camera included with some smart phones, with the camera device located in substantially the same plane as the display assembly or located in a plane that is substantially parallel to the plane of the display assembly. In some other implementations, a sensor may be associated with the display assembly, and the sensor may provide a signal that may be used to determine the illumination angle. The sensor also may be located in substantially the same plane as the display assembly or located in a plane that is substantially parallel to the plane of the display assembly. Examples of sensors are described further below with respect to FIGS. 13 and 14.

At block 1060, an optical gap in a first EMS display device of the display assembly is set, based at least in part on the determined illumination angle. In some implementations, the optical gap in a first EMS display device of the display assembly is set in real-time, based at least in part on the determined illumination angle. For example, the optical gap in the first EMS display device may be instructed to be set so that the device reflects a specific color. Due to the blue shift caused by the illumination angle, however, the color reflected by the EMS display device may not be the desired color intended to be reflected. For example, the optical gap in the first EMS display device may be instructed to be set so that the EMS display device reflects red light. Due to the blue shift, however, instead of reflecting red light, the EMS display device may reflect orange light. Setting the optical gap in the first EMS display device based at least in part on the determined illumination angle may compensate for the change in the wavelength of light reflected from the EMS display device due to the illumination angle and cause the EMS display device to reflect the desired specific color.

In some implementations, all or substantially all of the optical gaps of the EMS display devices in the array of EMS display devices of the display assembly may be set based at least in part on the determined illumination angle. It should be noted, however, that the optical gaps of different EMS display devices may be set to display different colors, and the optical gaps of the different EMS display devices may be adjusted, depending on the color to be generated, according to the equations described above.

In some implementations, a display assembly including an array of EMS display devices may have a refresh rate of about 30 Hertz (Hz) to 240 Hz. The refresh rate is the number of times in a second that display hardware draws the image to be displayed on a display assembly, for example. High refresh rates may be useful in generating moving images on the display assembly, without motion-blur effects being present, for example. Adjustments of the optical gap of an EMS display device due to changes in the illumination angle may not need to be performed at the same rate as the refresh rate, however, because changes in the illumination angle when a user is viewing an image on the display may not be very rapid. For example, if a user is reading text displayed on the display assembly, the user may be holding a device including the display assembly relatively stationary such that the user can read the text. With the device including the display assembly being held relatively stationary, changes in the illumination angle may not occur at a high frequency. In some implementations, operations in blocks 1055 and 1060 may be repeated at a frequency of at least about 1 Hz.

In some implementations, with the addition of a diffuser disposed on the front surface of the EMS display, a viewing angle of a user of about 5 degrees to 10 degrees deviating from the direction of light specularly reflected from the display assembly including an EMS display device may be assumed when the display assembly is illuminated with direct illumination. Specular reflection is the mirror-like reflection from a surface (for example, a mirror), in which light from a single incoming direction is reflected in a single outgoing direction. A viewing angle of about 5 degrees to 10 degrees deviating from the direction of light specularly reflected from the display assembly may avoid specular reflection from a cover glass, for example, of the display assembly, and also may yield a good color saturation of EMS display devices of the display assembly.

In some other implementations, when the assumption of the viewing angle being about 5 degrees to 10 degrees deviating from the direction of light specularly reflected from the display assembly is not made, a viewing angle also may be determined. Then, the optical gap in a first EMS display device of the display assembly may be set, based at least in part on both the illumination angle and the viewing angle. The viewing angle of an EMS display device and processes for determining the viewing angle are described further below with respect to FIGS. 11 and 12.

In some implementations, when operations in blocks 1055 and 1060 are repeated, a signal indicating the illumination angle may be filtered to remove high frequency changes in the illumination angle. For example, a low-pass electronic filter that passes low-frequency signals but attenuates signals with frequencies higher than a cutoff frequency may be used to filter a signal that includes the illumination angle.

Examples of low-pass electronic filters include first-order or second-order filters that may have cutoff frequencies of about 1 Hz to 10 Hz. Such high frequency changes in the illumination angle may be due to a user's hands shaking when holding a device including the display assembly, for example; the high frequency changes in the illumination angle may be removed from the illumination angle signal because the illumination angle may remain constant, on average, and there may not be a need to make adjustments for small, high frequency, changes in the illumination angle.

In some implementations, when there is more than one direct illumination source present, a weighted average (i.e., weighted by the brightness of each individual direct illumination source) of the illumination angles may be determined. This weighted average may be then be used as the illumination angle of the display assembly. For example, one instance in which many direct illumination sources are present is a football field at night being illuminated by stadium lights.

Light sources, however, may not provide direct illumination in some instances and the illumination of a display assembly may be by diffuse illumination. Diffuse illumination is lighting in which the display assembly is illuminated from many directions. For example, lighting in a room having many illumination sources with light from the illumination sources reflecting off of the walls of the room and other surfaces in the room may be considered diffuse illumination. Another example of diffuse illumination is the lighting outdoors on a cloudy day, with no direct light from the sun being present. In the case of diffuse illumination, an illumination angle may not be able to be determined.

Figure 11:
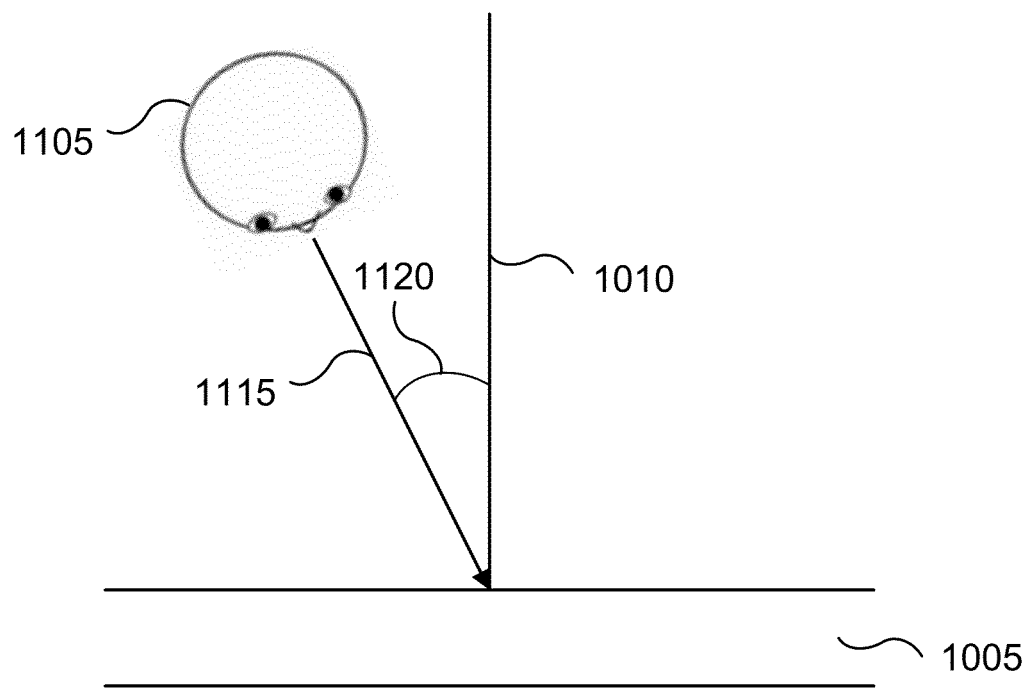
FIG. 11 shows an example of a diagram illustrating the viewing angle of a display assembly.

In some implementations, with diffuse illumination, an illumination angle is not determined, and instead a viewing angle is determined. FIG. 11 shows an example of a diagram illustrating the viewing angle of a display assembly. As shown in FIG. 11, a surface of a display assembly 1005 has a line 1010 perpendicular to it. When a user 1105 is viewing the surface of the display assembly 1005 along a path 1115, the viewing angle is an angle 1120. That is, the viewing angle may be taken as the angle 1120 between the line 1010 perpendicular to the display assembly 1005 and the user 1105.

When diffuse illumination is present and incident upon a display, the viewing angle 1120 a user 1105 has with the display assembly 1005 may have a similar effect as the illumination angle with direct illumination. For example, the color of light that some EMS display devices reflect may depend on the viewing angle. When the viewing angle increases, the reflected light may be shifted to a shorter wavelength. This also is known as blue shift, and the reflected light may not the desired color intended to be reflected. The blue shift of an EMS display device due to the viewing angle can be expressed with the same equations discussed above, with θ being the viewing angle instead of the illumination angle.

Figure 12:
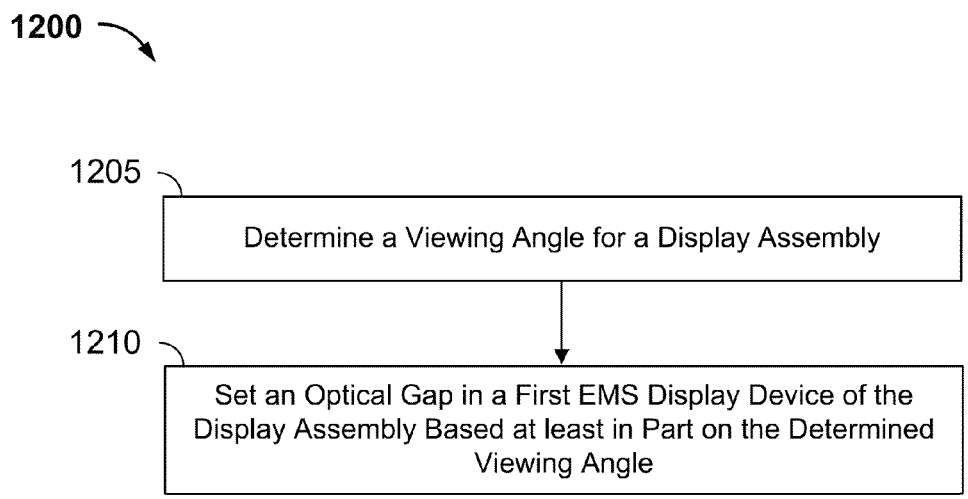
FIG. 12 shows an example of a flow diagram illustrating a process for compensating for the blue shift of an EMS display device under diffuse illumination.

FIG. 12 shows an example of a flow diagram illustrating a process for compensating for the blue shift of an EMS display device under diffuse illumination. At block 1205 of the process 1200, a viewing angle for a display assembly is determined. As explained above with respect to FIG. 11, the viewing angle may be taken as the angle between a line perpendicular or normal to a surface of the display assembly and a line defining a path between a user's eyes and the surface of the display assembly. In some implementations, the viewing angle for the display assembly is determined in real-time. In some implementations, the display assembly may include an array of EMS display devices.

For example, in some implementations, the display assembly may be part of a device, and a camera device that is also part of the device may provide a signal that may be used to determine the illumination angle. For example, the camera device may be the front-facing camera included with some smart phones, with the camera device located in substantially the same plane as the display assembly or located in a plane that is substantially parallel to the plane of the display assembly. The camera device may capture images of the face of the user, and using image features in the images, such as the eyes of the user, the viewing angle may be determined. See, for example, the method reported by Meyer, A., Böhme, et al., that uses a single camera for remote eye tracking, in Meyer, A., Böhme, M., Martinetz, T., and Barth, E. (2006) *A single-camera remote eye tracker*, Perception and Interactive Technologies, Volume 4021 of Lecture Notes in Artificial Intelligence, Springer, pp. 208-211 ("Meyer"), which is hereby incorporated by reference.

As described in Meyer, "remote" eye-tracking systems do not require any equipment to be mounted on a viewer. An example of a single-camera system that is described in Meyer includes a single camera, two infrared light sources mounted on either side of the camera and a display located above the light sources and the camera. In this example, the camera has a resolution of 1280×1024 pixels and the light sources are infrared LEDs that are configured to illuminate the face and to generate corneal reflexes on the surface of the user's corneas.

Meyer's system includes eye tracking software that includes two main components. The first component has image processing algorithms that are used to determine pupil locations and corneal reflexes from the image. The second component is a gaze estimation algorithm that estimates the part of a display at which a user is looking or "fixating."

The first software component may be based on the Starburst algorithm described in Li, D., Winfield, D., Parkhurst, D. J.: "Starburst: A hybrid algorithm for video-based eye tracking combining feature-based and model-based approaches" (Proceedings of the IEEE Vision for Human-Computer Interaction Workshop at CVPR (2005), pp. 1-8.), which is hereby incorporated by reference. An open source implementation of this algorithm is available under the name "openEyes." The first software component may determine the locations of the corneal reflexes by applying a difference of Gaussians and searching for maxima. The approximate pupil center may be determined to be the darkest pixel in the vicinity of the corneal reflexes. Primary contour points may be identified on rays emanating from the center of the pupil. Secondary contour points may be identified on secondary rays emanating from the primary contour points. An ellipse may be fitted to the primary and secondary contour points.

In the example described in Meyer, the second software component (the gaze estimation algorithm) is based on a physical model of the eye. This model may approximate the surface of the cornea, the pupil center and the angular offset between the optical axis of the eye and the direction of the gaze.

The surface of the cornea may be modeled as a spherical surface with a center of curvature CC and a curvature radius of $r_{cornea}$. The corneal surface is significant for eye tracking because the corneal reflexes are generated by reflections of the infrared LEDs at the corneal surface and because the image of the pupil observed through the cornea may be distorted by refraction at the corneal surface.

In this model, the pupil is assumed to be perfectly circular. The pupil center PC is assumed to be at a distance $r_{pc}$ from the center of corneal curvature CC.

The angular offset between the optical axis of the eye and the direction of the gaze is referred to as $\alpha_{fovea}$. This offset is caused by the fact that the fovea centralis (located in the center of the macula region of the retina) does not lie on the optical axis but is offset temporally and slightly upwards.

Given the position and orientation of an eye relative to the camera, the eye model can predict where the pupil and the corneal reflexes should be observed in the camera image. Alternatively, the direction of gaze may be determined from the pupil and corneal reflex position. The values of the model parameters for a particular user may be determined by prompting a user to fixate a series of calibration points and finding the set of parameter values that best explain the observations.

Alternatively, the viewing angle may not be measured, but can be assumed based upon, for example, behavioral studies. Various viewing angles may be stored and used to adjust the display (e.g., by adjusting the optical gap of IMODs) based on some usage model information. For example, based upon studies of display device users, it may be known that in direct illumination, people often hold the display in a certain orientation and hence the viewing angle may be assumed to be a first value in direct illumination. Similarly, studies may indicate that in indirect or diffuse illumination, people often hold the display in a different orientation and hence the viewing angle may be assumed to be a second value in indirect or diffuse illumination environments. The first viewing angle value and second viewing angle value may be different values. Other variables may be used to determine the viewing angle without directly or indirectly measuring it.

At block 1210, an optical gap in a first EMS display device of the display assembly is set, based at least in part on the viewing angle. In some implementations, the optical gap in the first EMS display device of the display assembly is set in real-time, based at least in part on the viewing angle. For example, the optical gap in the first EMS display device may be instructed to be set so that the device reflects a specific color. Due to the blue shift caused by the viewing angle, however, the color reflected by the EMS display device may not be the desired color intended to be reflected. Setting the optical gap in the first EMS display device based at least in part on the viewing angle may compensate for the changes in the wavelength of light reflected from the EMS display device due to the viewing angle. In some implementations, all or substantially all of the optical gaps of the EMS display devices in the array of EMS display devices of the display assembly may be set based at least in part on the viewing angle.

Similar to the illumination angle implementations described above with respect to FIG. 10, in some implementations, a display assembly including an array of EMS display devices may have a refresh rate of about 30 Hertz (Hz) to 240 Hz. Adjustments of the optical gap of an EMS display device may not need to be performed at the same rate as the refresh rate, however, because changes in the viewing angle when a user is viewing an image on the display may not be very rapid. In some implementations, operations in blocks 1205 and 1210 may be repeated at a frequency of at least about 1 Hz.

Again, similar to the illumination angle implementations described above with respect to FIG. 10, in some implementations, when operations in blocks 1205 and 1210 are repeated, a signal indicating the viewing angle may be filtered to remove high frequency changes in the viewing angle. For example, a low-pass electronic filter that passes low-frequency signals but attenuates signals with frequencies higher than a cutoff frequency may be used to filter a signal that includes the viewing angle. Such low-pass electronic filters include $1^{st}$ order or $2^{nd}$ order filters that may have cutoff frequencies of about 1 Hz to 10 Hz.

In some implementations, one or both of the illumination angle and the viewing angle may be determined. Further, as noted above with respect to FIG. 10, in some implementations, when a display assembly is illuminated with direct illumination, an assumption of values for the viewing angle may not be made and a viewing angle may be determined. In some implementations, a signal from a sensor may be used to determine the illumination angle, and a signal from a camera device may be used to determine the viewing angle. In some other implementations, signals from a single camera device may be used to determine both the illumination angle and the viewing angle. An optical gap in a first EMS display device of the display assembly may be set, based at least in part on both the illumination angle and the viewing angle. In some implementations, when the direct illumination is about 4 times to 10 times brighter than the diffuse illumination, the diffuse illumination may not be considered due to the brightness of the direct illumination and the direct illumination being the main source of illumination for the display assembly.

In some implementations, the processes described with respect to FIGS. 10 and 12, and combinations thereof, may be implemented with an interrupt based system. For example, with the process 1050 of FIG. 10B, the illumination angle may be monitored. When the illumination angle is substantially constant, no new calculations may be performed to adjust the optical gaps in EMS display devices to compensate for blue shift. When, however, the illumination angle changes by a specified amount, new calculations may be performed to adjust the optical gaps in EMS display devices to compensate for blue shift. Similarly, with the process 1200 of FIG. 12, the viewing angle may be monitored. When the viewing angle is substantially constant, no new calculations may be performed to adjust the optical gaps in EMS display devices to compensate for blue shift. When, however, the viewing angle changes by a specified amount, new calculations may be performed to adjust the optical gaps in EMS display devices to compensate for blue shift.

Figure 13:
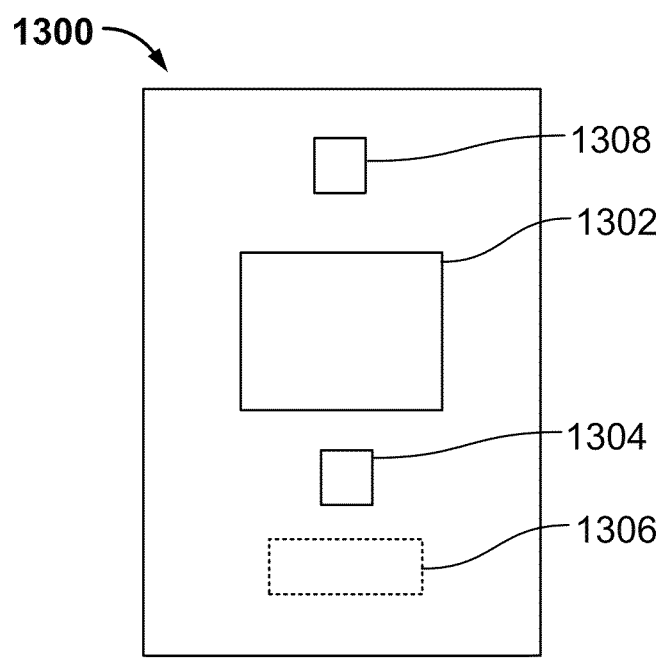
FIG. 13 shows an example of a block diagram of an apparatus including a display assembly and a sensor configured to measure the illumination angle.

FIG. 13 shows an example of a block diagram of an apparatus including a display assembly and a sensor configured to measure the illumination angle. An apparatus 1300 shown in FIG. 13 includes a display assembly 1302, a sensor 1304, a processor 1306 and a camera device 1308. The apparatus 1300 may be a smart phone, a cellular or mobile telephone, an e-book, or a tablet computer, for example. The display assembly 1302 may include an array of EMS display devices.

In some implementations, the sensor 1304 may include a lens and a plurality of photosensors. In some implementations, the plurality of photosensors may include at least four photosensors arranged in a 2×2 array format. In some implementations, the plurality of photosensors may be arranged as an array of photosensors, with the array of photosensors including a charge-coupled device (CCD) array or a complementary metal-oxide-semiconductor (CMOS) array. An example of one implementation of a sensor is described with respect to FIGS. 14A and 14B.

The sensor 1304 may provide a signal that may be used to determine an illumination angle with respect to a line perpendicular to the display assembly 1302 when direct illumination is present. In some implementations, the sensor 1304 may be located in substantially the same plane as the display assembly 1302 or located in a plane that is substantially parallel to the plane of the display assembly 1302.

In some implementations, the processor 1306 is configured to communicate with the display assembly 1302 and the sensor 1304. The processor 1306 may be configured to receive a signal from the sensor 1304 indicating the illumination angle. The processor 1306 may be configured to determine the illumination angle with respect to a line perpendicular to the display assembly indicated by the signal. Using the determined illumination angle, the processor 1306 may be configured to process image data to compensate for the illumination angle and a resulting change in a wavelength of light reflected from an EMS display device of the display assembly 1302. That is, the processor 1306 may be configured to perform a process similar to the process 1050 described with respect to FIG. 10B. In some implementations, the processor 1306 may be configured to perform further operations, such as the operations that processor 21 may perform, as described below with respect to FIGS. 15A and 15B. In some other implementations, a display device 40 described below with respect to FIGS. 15A and 15B may include the sensor 1304 and a camera device and may be configured to perform the processes described herein. In some implementations, the apparatus 1300 may include a low-haze diffuser (for example, about 50% to 70% overlaying the display assembly 1302).

In some implementations, the apparatus 1300 also may include a camera device 1308 on the same face of the apparatus 1300 as the display assembly 1302 and the sensor 1304. The camera device 1308 may be the type of front-facing camera included with some smart phones, for example, with the camera device 1308 located in substantially the same plane as the display assembly 1302 or located in a plane that is substantially parallel to the plane of the display assembly 1302. In some implementations, the camera device 1308 may be configured to provide a signal that may be used to determine a viewing angle with respect to a line perpendicular to the display assembly. The processor 1306 may be further configured to process image data to compensate for the viewing angle and a resulting change in a wavelength of light reflected from the first electromechanical systems display device of the display assembly 1302 due to the viewing angle.

In some other implementations, instead of using the sensor 1304 to determine the illumination angle, the camera device 1308 may be used. In some implementations, the sensor 1304 may use less power than a camera device, however.

Figure 14A:
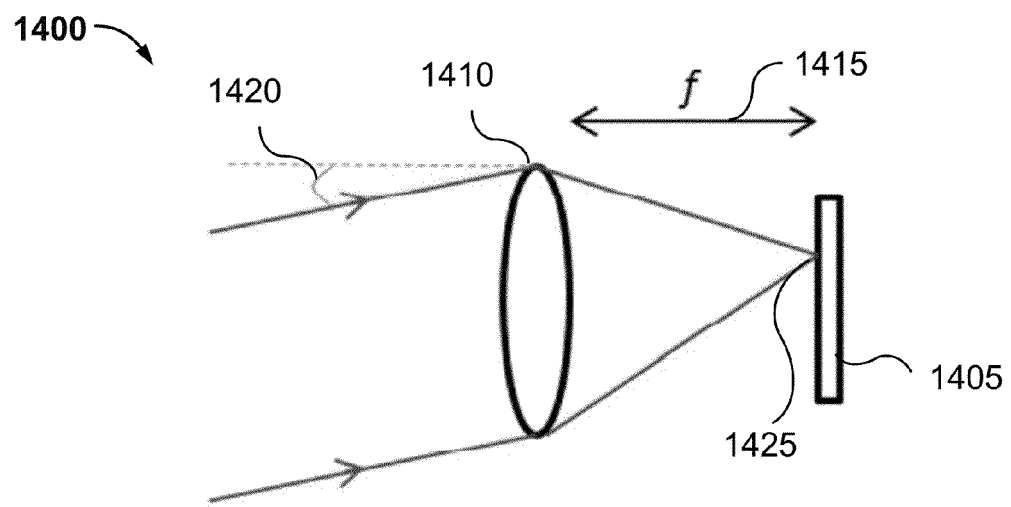
FIGS. 14A and 14B show examples of schematic illustrations of a sensor configured to measure the illumination angle.
Figure 14B:
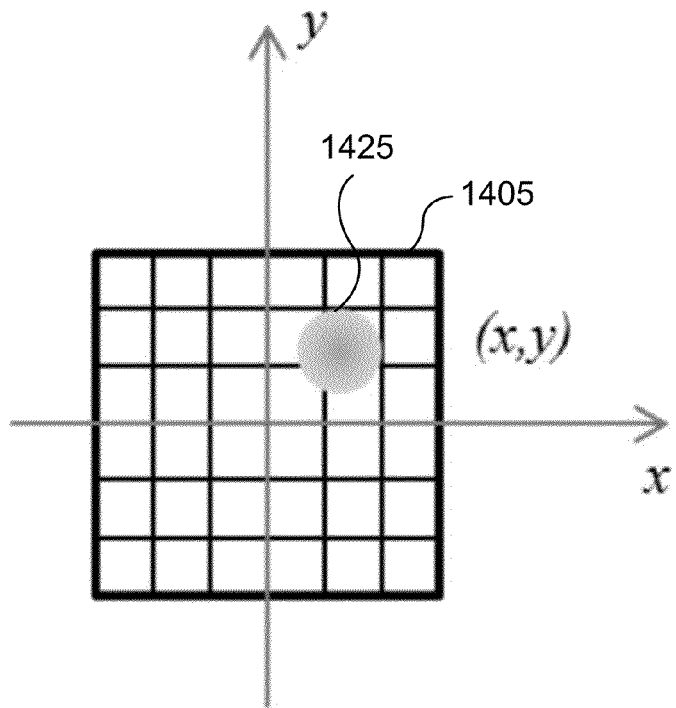

FIGS. 14A and 14B show examples of schematic illustrations of a sensor configured to measure the illumination angle. FIG. 14A shows a side view of a sensor 1400, and FIG. 14B shows the face of a photosensor array 1405 that is part of the sensor 1400. As shown in FIG. 14A, the sensor 1400 may include the photosensor array 1405 and a lens 1410. In some implementations, the photosensor array 1405 may be positioned to be at the focal point of the lens 1410.

The photosensor array 1405 may include a plurality of photosensors. For example, the photosensor array 1405 shown in FIG. 14 includes four photosensors, each of which occupies a quadrant of the illustrated (x,y) plane: accordingly, the photosensor array 1405 may be called a "quad" photosensor. For example, the photosensor array 1405 may include a 54349 quadrant Si PIN photodiode made by Hamamatsu that has an active area of 3 mm×3 mm. For some implementations, a smaller active sensor area quad Si photodiode with lower power consumption and lower cost is preferred. In some other implementations, the photosensor array 1405 may include at least about 4 photosensors, or about 9 (for example, a 3 by 3 array) to about 100 (for example, a 10 by 10 array) photosensors. In some implementations, the photosensor array 1405 of the sensor 1400 may include a CCD array or a CMOS array. For example, commercial off-the-shelf low cost QVGA resolution COMS imager will be sufficient for this application. For reducing power consumption, such imager can be operated in 1 Hz. In some implementations, the sensor 1400 could be used as the sensor 1304 of the device 1300 shown in FIG. 13.

In some implementations, the lens 1410 may be a lens including a single element. In some implementations, the diameter of the lens 1410 may be about 0.5 millimeters (mm) to 2 mm, or about 1 mm. A focal length 1415 of the lens 1410 may be about 0.5 mm to 3 mm, or about 1.5 mm to 2 mm. In some implementations, the photosensor array 1405 may have dimensions of about 1 mm by 1 mm to about 4 mm by 4 mm. Such a photosensor array 1405, combined with a lens 1410 with a diameter of about 0.5 mm and a focal length of about 0.5 mm to 2 mm, may be able to determine an illumination angle of about ±45 degrees. In some implementations, larger illumination angles may be determined with a sensor 1400 including a lens 1410 with a shorter focal length 1415 (for example, a focal length shorter than about 0.5 mm to 2 mm) or a larger photosensor array 1405 (for example, a photosensor array larger than about 4 mm by 4 mm).

When the sensor 1400 is operated, the lens 1410 focuses light having an illumination angle 1420 of θ at a focal point 1425 on the photosensor array 1405. The light incident upon the photosensor array 1405 may generate a current. From this current, the x, y coordinates of the position of the focal point 1425 of the light on the photosensor array 1405 may be determined. For example, the x, y coordinates of the position of the focal point 1425 of the light on the photosensor array 1405 may be determined, based on the current, with a lookup table associated with the photosensor array 1405. Using the focal length 1415 (f) of the lens 1410 and the x, y coordinates of the position of the focal point 1425 of the light on the photosensor array 1405, the illumination angle 1420 can be determined by:

$$\theta = \tan^{-1}\left(\frac{\sqrt{x^2 + y^2}}{f}\right)$$

When there are multiple direct illumination sources, multiple light spots may be formed on the photosensor array 1405. The photosensor array 1405 may measure the x, y coordinates of each light spot as well as the intensity of each light spot. The measured spot intensity is proportional to the brightness (I) of the illumination source. The average illumination angle can be calculated via weighted averaging:

$$\overline{\theta} = \frac{1}{\sum_i I_i} \sum_i I_i \theta_i$$

In some implementations, the sensor 1400 may have a resolution of about 0.01 degrees, about 0.1 degrees, or about 1 degree. In some implementations, a sensor 1400 having a resolution of about 1 degree may be suitable for the illumination angle determination. Such a relatively low resolution sensor (for example, a resolution of about 1 degree) may allow for the use of a less expensive photosensor array and/or lens.

Figure 15A:
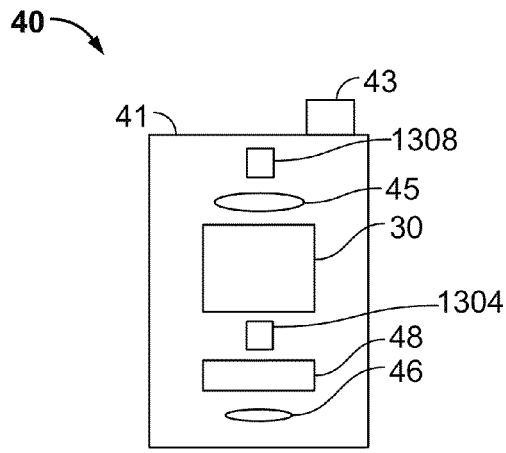
FIGS. 15A and 15B show examples of system block diagrams illustrating a display device that includes a plurality of interferometric modulators.
Figure 15B:
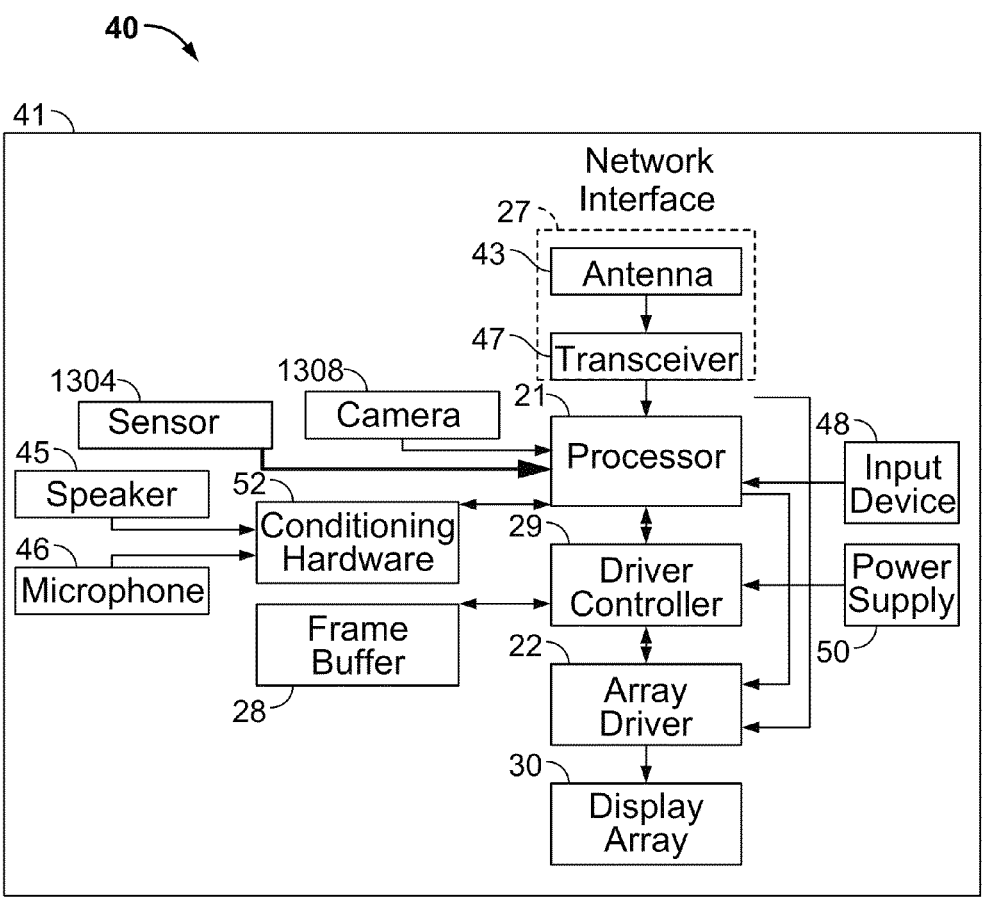

FIGS. 15A and 15B show examples of system block diagrams illustrating a display device 40 that includes a plurality of interferometric modulators. The display device 40 can be, for example, a smart phone, a cellular or mobile telephone. However, the same components of the display device 40 or slight variations thereof are also illustrative of various types of display devices such as televisions, tablets, e-readers, hand-held devices and portable media players.

The display device 40 includes a housing 41, a display 30, an antenna 43, a speaker 45, an input device 48, a microphone 46, a sensor 1304 and a camera device 1308. The housing 41 can be formed from any of a variety of manufacturing processes, including injection molding, and vacuum forming. In addition, the housing 41 may be made from any of a variety of materials, including, but not limited to: plastic, metal, glass, rubber and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an interferometric modulator display, as described herein.

The components of the display device 40 are schematically illustrated in FIG. 15B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (for example, filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. In some implementations, a power supply 50 can provide power to substantially all components in the particular display device 40 design.

In this example, the display device 40 includes a sensor 1304 and a camera device 1308, which may be similar to those described above with reference to FIG. 13. The processor 21 may be configured for communication with the sensor 1304 and the camera device 1308. In some implementations, the processor 21 may be configured to determine an illumination angle and/or a viewing angle, as described above. The processor 21 may make such determinations based on input from the sensor 1304 and/or the camera device 1308. In some implementations, the processor 21 may be configured to control the display 30 to compensate for the determined illumination angle and/or viewing angle. For example, the processor 21 may be configured to change a gap between an absorber stack and a reflective stack of one or more IMODs of the display 30 in order to compensate for the determined illumination angle and/or viewing angle.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation and gray-scale level.

The processor 21 can include a microcontroller, CPU, or logic unit to control operation of the display device 40. In some implementations, the processor 21 may be configured to perform at least some of the methods described herein, e.g., method 1050 and/or method 1200. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

In some implementations, the driver controller 29 may be configured to control the display 30 to compensate for a determined illumination angle and/or viewing angle. For example, the processor 21 may determine the illumination angle and/or viewing angle and may provide corresponding data to the driver controller 29. The driver controller 29 or the processor may be configured to change a gap height between an absorber stack and a reflective stack of one or more IMODs of the display 30 in order to compensate for the determined illumination angle and/or viewing angle. The driver controller 29 or the processor may change the gap height by changing a voltage at which an IMOD will be driven.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (such as an IMOD controller). Additionally, the array driver 22 can be a conventional driver or a bi-stable display driver (such as an IMOD display driver). Moreover, the display array 30 can be a conventional display array or a bi-stable display array (such as a display including an array of IMODs). In some implementations, the driver controller 29 can be integrated with the array driver 22. Such an implementation can be useful in highly integrated systems, for example, mobile phones, portable-electronic devices, watches or small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with display array 30, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blue-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other possibilities or implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of an IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, a person having ordinary skill in the art will readily recognize that such operations need not be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus for displaying an image comprising:
    a display assembly including an array of electromechanical systems display devices;
    a sensor configured to provide a first signal, the sensor being oriented in a sensor plane having a first angle relative to a plane of the display assembly; and
    a processor configured to:
        communicate with the display assembly and the sensor, the processor configured to receive the first signal;
        determine an illumination angle with respect to a line perpendicular to the display assembly indicated by the first signal; and
        process image data to compensate the image for the determined illumination angle.

2. The apparatus of claim 1, wherein the processor is further configured to process the image data to compensate the image for a change in a wavelength of light reflected from a first one of the electromechanical systems display devices, the change in wavelength resulting from the determined illumination angle.

3. The apparatus of claim 1, wherein the sensor includes:
    a plurality of photosensors; and
    a lens.

4. The apparatus of claim 3, wherein the plurality of photosensors is arranged as an array of photosensors, the array of photosensors including at least one of a charge-coupled device array and a complementary metal-oxide-semiconductor array.

5. The apparatus of claim 1, further comprising:
a diffuser configured for producing a haze of about 70% to 90% overlaying the display assembly.

6. The apparatus of claim 1, further comprising:
a camera device configured to provide a second signal, the camera device being oriented in a camera plane having a second angle relative to the plane of the display assembly, wherein the processor is further configured to:
receive the second signal;
determine a viewing angle with respect to the line perpendicular to the display assembly indicated by the second signal; and
process the image data to compensate the image for the determined viewing angle.

7. The apparatus of claim 6, wherein the processor is further configured to process the image data to compensate the image for a change in a wavelength of light reflected from a first one of the electromechanical systems display devices, the change in wavelength resulting from the determined viewing angle.

8. The apparatus of claim 1, further comprising:
a memory device configured to communicate with the processor;
a driver circuit configured to send at least one second signal to the display assembly; and
a controller configured to send at least a portion of the image data to the driver circuit.

9. The apparatus of claim 1, further comprising:
an image source module configured to send the image data to the processor.

10. The apparatus of claim 9, wherein the image source module includes at least one of a receiver, transceiver, and transmitter.

11. The apparatus of claim 1, further comprising:
an input device configured to receive input data and to communicate the input data to the processor.

12. A method comprising:
(a) determining at least one of an illumination angle or a viewing angle with respect to a line perpendicular to a display assembly, the display assembly including an array of electromechanical systems display devices; and
(b) if the at least one of the determined illumination angle or viewing angle is non-zero, setting an optical gap in at least one of the electromechanical systems display devices of the display assembly based at least in part on the determined illumination angle and/or viewing angle, the optical gap being set to compensate for the at least one of the determined illumination angle or viewing angle.

13. The method of claim 12, wherein the setting process involves setting the optical gap to compensate for a change in a wavelength of light reflected from the first electromechanical systems display device, the change caused by at least one of the illumination angle or the viewing angle.

14. The method of claim 12, further comprising:
filtering a signal indicating the at least one of the determined illumination angle or viewing angle to remove one or more high frequency changes in the illumination angle or viewing angle, wherein the illumination angle or viewing angle is determined using the signal.

15. The method of claim 12, further comprising:
receiving a signal indicating the at least one of the illumination angle or viewing angle from at least one of a camera device and a sensor, the at least one of the camera device and the sensor being oriented in a plane having a second angle relative to a plane of the display assembly wherein the at least one of the illumination angle or viewing angle is determined using the signal.

16. The method of claim 12, further comprising:
determining both an illumination angle and a viewing angle with respect to the line perpendicular to the display assembly, wherein operation (b) further includes setting the optical gap in the first electromechanical systems display device based at least in part on both the determined illumination angle and the determined viewing angle.

17. A non-transitory computer machine-readable medium including program instructions for control of an apparatus including a display assembly, the program instructions including code for operations comprising:
(a) determining at least one of an illumination angle or a viewing angle with respect to a line perpendicular to a display assembly, the display assembly including an array of electromechanical systems display devices; and
(b) if the at least one of the determined illumination angle or viewing angle is non-zero, setting an optical gap in at least one of the electromechanical systems display devices of the display assembly based at least in part on the determined illumination angle and/or viewing angle, the optical gap being set to compensate for at least one of the determined illumination angle or viewing angle.

18. The medium of claim 17, wherein the setting process involves setting the optical gap to compensate for a change in a wavelength of light reflected from the first electromechanical systems display device, the change caused by at least one of the illumination angle or the viewing angle.

* * * * *